United States Patent
Orsley

(10) Patent No.: US 7,639,234 B2
(45) Date of Patent: Dec. 29, 2009

(54) CAPACITIVE SENSING AND ABSOLUTE POSITION MAPPING IN DISPLACEMENT TYPE POINTING DEVICES

(75) Inventor: Timothy James Orsley, San Jose, CA (US)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 566 days.

(21) Appl. No.: 11/619,681

(22) Filed: Jan. 4, 2007

(65) Prior Publication Data

US 2008/0164076 A1 Jul. 10, 2008

(51) Int. Cl.
*G09G 5/00* (2006.01)
(52) U.S. Cl. .................... 345/156; 345/160
(58) Field of Classification Search ......... 345/156–183; 178/18.01–18.05
See application file for complete search history.

(56) References Cited

U.S. PATENT DOCUMENTS

| | | | |
|---|---|---|---|
| 5,889,507 A | 3/1999 | Engle et al. | |
| 6,215,478 B1* | 4/2001 | Yeh et al. | 345/173 |
| 6,657,559 B1 | 12/2003 | Li | |
| 6,667,733 B2 | 12/2003 | Miyoshi | |
| 6,753,848 B2 | 6/2004 | Toshiharu | |
| 6,765,557 B1 | 7/2004 | Segal et al. | |
| 7,061,468 B2 | 6/2006 | Tiphane et al. | |
| 7,253,643 B1* | 8/2007 | Seguine | 324/686 |
| 7,344,273 B2* | 3/2008 | Lewis et al. | 362/233 |
| 2002/0149509 A1 | 10/2002 | Kim et al. | |
| 2004/0032392 A1 | 2/2004 | Chi et al. | |
| 2004/0108993 A1 | 6/2004 | Suzuki et al. | |
| 2004/0130531 A1 | 7/2004 | Cheng | |
| 2005/0052406 A1* | 3/2005 | Stephanick et al. | 345/156 |
| 2005/0052429 A1* | 3/2005 | Philipp | 345/173 |
| 2005/0110755 A1 | 5/2005 | Harley et al. | |
| 2005/0190150 A1* | 9/2005 | Drake | 345/156 |
| 2006/0026536 A1 | 2/2006 | Hotelling et al. | |
| 2006/0152491 A1 | 7/2006 | Lian | |
| 2007/0279395 A1* | 12/2007 | Philipp et al. | 345/173 |
| 2007/0291016 A1* | 12/2007 | Philipp | 345/174 |
| 2008/0012837 A1* | 1/2008 | Marriott et al. | 345/173 |
| 2008/0024455 A1* | 1/2008 | Lee et al. | 345/173 |
| 2008/0041642 A1* | 2/2008 | Trent et al. | 178/18.06 |
| 2008/0088595 A1* | 4/2008 | Liu et al. | 345/173 |
| 2008/0150905 A1* | 6/2008 | Grivna et al. | 345/173 |
| 2009/0135157 A1* | 5/2009 | Harley | 345/174 |

* cited by examiner

*Primary Examiner*—Nitin Patel

(57) ABSTRACT

A displaceable member moves in an operational zone over a sense system that includes a spatial arrangement of sense electrodes and at least one drive electrode. A conductive coupling element of the displaceable member capacitively couples signals from the at least one drive electrode to ones of the sense electrodes underlying the conductive coupling element. A measurement system generates measurement signals indicating amounts of overlap between the conductive coupling element and ones of the sense electrodes. A processing system produces from the measurement signals an output signal with information conveying motion measures corresponding to absolute positions of the conductive coupling element in the operational zone. At least one regional sense electrode may include discrete electrically conducting sensing elements distributed across a respective region of the operational zone. The drive electrode may include discrete electrically conducting sensing elements interspersed among the sensing elements of the at least one regional sense electrode.

23 Claims, 13 Drawing Sheets

CAPACITIVE SENSING AND ABSOLUTE POSITION MAPPING IN DISPLACEMENT TYPE POINTING DEVICES

CROSS-REFERENCE TO RELATED APPLICATIONS

This application relates to copending U.S. patent application Ser. No. 11/488,559 filed Jul. 18, 2006, by Jonah Harley et al. and entitled "CAPACITIVE SENSING IN DISPLACEMENT TYPE POINTING DEVICES," which is incorporated herein by reference.

BACKGROUND

Many different types of pointing devices have been developed for inputting commands into a machine. For example, hand-manipulated pointing devices, such as computer mice, joysticks, trackballs, touchpads, and keyboards, commonly are used to input instructions into a computer by manipulating the pointing device. Such pointing devices allow a user to control movement of a cursor (i.e., a virtual pointer) across a computer screen, select or move an icon or other virtual object displayed on the computer screen, and open and close menu items corresponding to different input commands.

Pointing devices have been developed for large electronic devices, such as desktop computers, which are intended to remain stationary, and for small portable electronic devices, such as cellular telephones and mobile computer systems. Pointing devices for large electronic devices typically have fewer and more flexible design constraints than pointing devices for portable electronic devices because of the greater space and power resources that are available. In general, a pointing device for use in portable electronic devices should allow a user to move a cursor quickly and accurately, operate in an intuitive fashion, and operate within limited workspace and power constraints.

Displacement type pointing devices have been developed to meet the constraints inherent in portable electronic devices. These types of pointing devices include a displaceable member (e.g., a puck, button, or other movable body) that moves in a defined field of motion upon application of force by, for example, a user's finger. In a typical displacement-type pointing device, the displaceable member moves in two dimensions in response to lateral forces that are directed in a plane. Resistor circuits, capacitive sensors, and magnetic (Hall-effect) sensors have been used to determine the displacement of the displaceable member within the field of motion. The determined displacement of the displaceable member is mapped to two-dimensional motion of a cursor on a display. A restoring mechanism (e.g., a set of springs) typically returns the displaceable member to a central location within the field of motion after the user releases the displaceable member. The position mapping system typically fixes the position of the cursor on the display when the displaceable member is in the central location of the field of motion.

The field of motion of the displaceable member typically is very small. As a result, displacement type pointing devices typically operate in either a relative device-cursor mapping mode or a velocity mapping (or joystick) mode. In a relative device-cursor mapping mode, the position of the displaceable member and the position of the cursor on the display can be offset with a variable mapping. In a velocity mapping mode, the displacement of the displaceable member is mapped to the velocity of the cursor on the display. The field of motion of the displaceable member typically is too small to provide an absolute device-cursor mapping mode in which there is a one-to-one correspondence between the position of the displaceable member and the position of the cursor on the screen.

What are needed are displacement type pointing device and methods that are capable of sensing movement of the displaceable member with high accuracy and provide an absolute position mapping mode of input in which there is a one-to-one correspondence between the positions of the displaceable member and the positions of a cursor on a display.

SUMMARY

In one aspect, the invention features an input apparatus that includes a sense system, a displaceable member, a measurement system, and a processing system. The sense system includes a spatial arrangement of sense electrodes and at least one drive electrode. The displaceable member moves in an operational zone over the sense system and includes a conductive coupling element operable to capacitively couple signals from the at least one drive electrode to ones of the sense electrodes underlying the conductive coupling element. The measurement system generates measurement signals indicative of amounts of overlap between the conductive coupling element and ones of the sense electrodes. The processing system produces from the measurement signals an output signal with information conveying motion measures corresponding to absolute positions of the conductive coupling element in the operational zone.

In other aspect, the invention features an input apparatus that includes a sense system and a displaceable member. The sense system includes a spatial arrangement of regional sense electrodes in respective regions of an operational zone and at least one drive electrode. At least one of the regional sense electrodes includes discrete electrically conducting sensing elements distributed across a respective one of the regions of the operational zone. The drive electrode includes discrete electrically conducting sensing elements interspersed among the sensing elements of the at least one regional sense electrode. The displaceable member moves in an operational zone over the sense system and includes a conductive coupling element that capacitively couples signals from the at least one drive electrode to ones of the sense electrodes underlying the conductive coupling element.

In another aspect, the invention features an input method in accordance with which, in response to movement of a displaceable member in an operational zone over a spatial arrangement of sense electrodes and at least one drive electrode, measurement signals indicative of amounts of overlap between a conductive coupling element of the displaceable member and ones of the sense electrodes are generated. An output signal with information conveying motion measures corresponding to absolute positions of the conductive coupling element in the operational zone is produced from the measurement signals.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. INTRODUCTION

Figure 1:
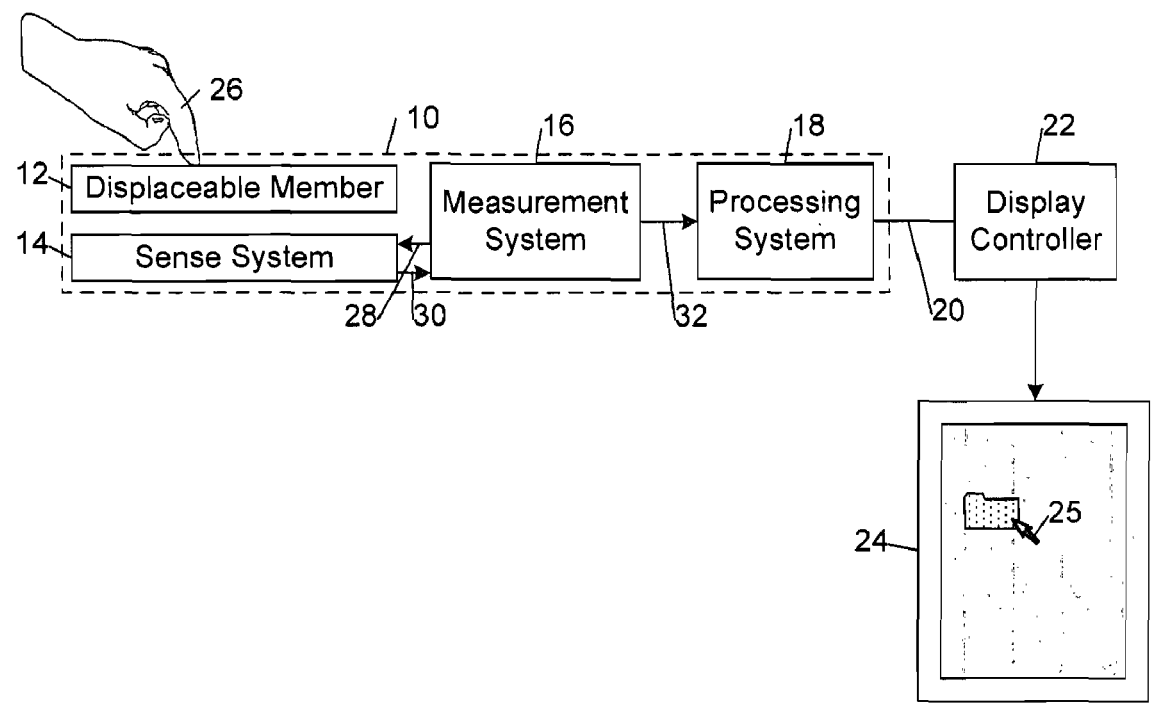
FIG. 1 is a diagrammatic view of an embodiment of a pointing device that includes a displaceable member, a sense system, a measurement system, and a processing system in an exemplary operational environment.

FIG. 1 shows an embodiment of a pointing device 10 that includes a displaceable member 12, a sense system 14, a measurement system 16, and a processing system 18. As explained in detail below, the pointing device 10 is capable of sensing movement of the displaceable member 12 with high accuracy and provides an absolute position mapping mode of input in which the positions of the displaceable member 12 are mapped to positions of a cursor with a one-to-one correspondence.

In general, the pointing device 10 may be incorporated into any type of device or system in which inputting control signals serves a useful purpose. For illustrative purposes, the pointing device 10 is described herein as a component of a system for inputting graphical user interface commands into a machine (e.g., a portable or desktop computer). In the illustrative operational environment shown in FIG. 1, the pointing device 10 transmits an output signal 20 to a display controller 22 that drives a display 24. In some embodiments, the processing system 18 produces the output signal 20 with information conveying motion measures that are indicative of movement of the displaceable member 12 in the operational zone. Examples of the types of output signals 20 that may be produced by the processing system 18 include: position data (e.g., distance along the axes of a coordinate system centered at a designated origin of the operational zone) that describe the absolute or relative positions of the displaceable member 12; velocity data that describe the velocity of the displaceable member 12; and scrolling position and distance data. The display controller 22 processes the output signal 20 to control, for example, the movement of a cursor 25 on the display 24.

In some embodiments, the pointing device 10 and the display 24 are integrated into a single unitary device, such as a portable (e.g., handheld) electronic device. The portable electronic device may be any type of device that can be readily carried by a person, including a cellular telephone, a cordless telephone, a pager, a personal digital assistant (PDA), a digital audio player, a digital camera, and a digital video game console. In other embodiments, the pointing device 10 and the display 24 are implemented as separate discrete devices, such as a separate pointing device and a remote display-based system. In general, the remote system may be any type of display-based appliance that receives user input, including a general-purpose computer system, a special-purpose computer system, and a video game system.

The display control signals 20 may be transmitted to remote system over a wired communication link (e.g., a serial communication link, such as an RS-232 serial port, a universal serial bus, or a PS/2 port) or a wireless communication link (e.g., an infrared (IR) wireless link or a radio frequency (RF) wireless link). In some of these embodiments, one or more modules and, consequently, one or more functionalities of the processing system 16 may be incorporated in the remote system instead of being incorporated in the pointing device 10.

The processing system 18 typically is implemented by one or more discrete modules that are not limited to any particular hardware, firmware, or software configuration. The one or more modules may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the modules of the processing system 18 and the data generated by these modules are stored in one or more computer-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD/DVD-ROM.

The display controller 22 typically executes a driver to process the output signal 20. In general, the driver may be implemented in any computing or processing environment, including in digital electronic circuitry or in computer hardware, firmware, or software. In some embodiments, the driver is a component of an operating system or an application program.

The display 24 may be, for example, a flat panel display, such as a LCD (liquid crystal display), a plasma display, an EL display (electro-luminescent display) and a FED (field emission display).

As explained in detail below, the displaceable member 12 includes a conductive coupling element and the sense system 14 includes a spatial arrangement of sense electrodes and at least one drive electrode. The displaceable member 12 may be implemented by a puck, button, or other movable body. In some embodiments, the displaceable member 12 consists of an electrically conducting body in which case the displaceable member consists entirely of the conductive coupling element. In other embodiments, the displaceable member 12 includes other elements (e.g., an input button) in addition to the conductive coupling element.

The displaceable member 12 is movable within a confined field of motion, which is referred to herein as the "operational zone." In one exemplary mode of operation, a user's finger 26 manipulates the displaceable member 12 within the operational zone and the sense system 14 detects the position of the displaceable member in the operational zone. The conductive coupling element capacitively couples input signals 28 that are applied by the measurement system 16 to the at least one drive electrode to ones of the sense electrodes underlying the conductive coupling element. In response to the applied input signals 28, the sense electrodes produce sense signals 30 that are responsive to a touching of the displaceable member 12 by the user's finger 26 and to the different positions of the displaceable member 12 in the operational zone.

II. EXEMPLARY EMBODIMENTS OF THE SENSE SYSTEM AND THE DISPLACEABLE MEMBER

Figure 2A:
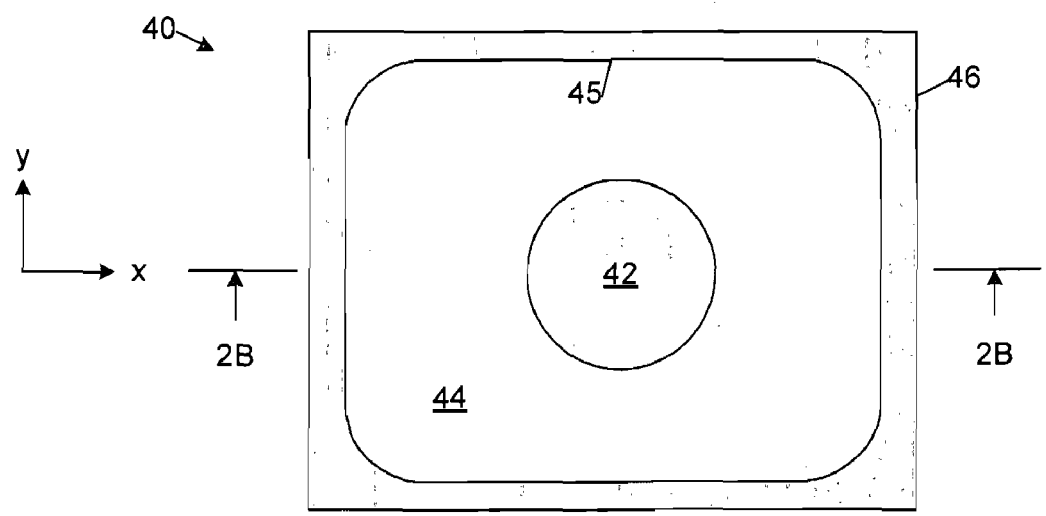
FIG. 2A is a diagrammatic top view of an embodiment of the pointing device shown in FIG. 1.
Figure 2B:
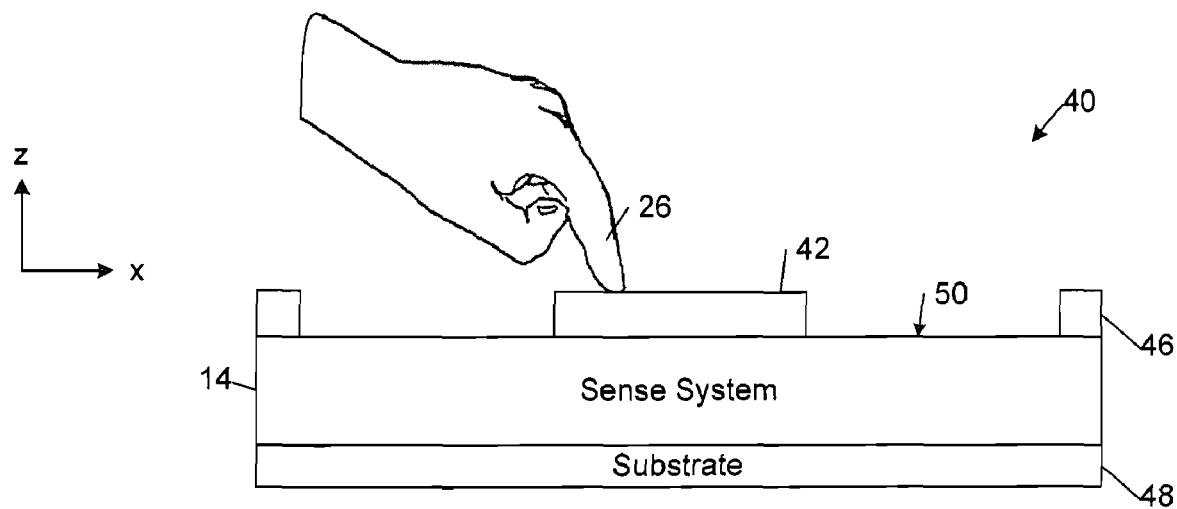
FIG. 2B is a cross-sectional view of the pointing device shown in FIG. 2A taken along the line 2B-2B.

FIG. 2A shows a top view of an exemplary embodiment 40 of the pointing device 10. FIG. 2B shows a cross-sectional view of the pointing device 40 taken along the line 2B-2B. In the pointing device 40, the displaceable member 12 is implemented by a puck 42. The puck 42 is movable within an operational zone 44 that is defined by walls 45 of a support frame 46. The operational zone 44 may have any shape, including a curved shape (e.g., an elliptical shape and circular shape), a polygonal shape (e.g., a rectangular shape), and a curvilinear shape. In the illustrated embodiment, the operational zone 44 has a rectangular shape with rounded corners that have curvature radii matching the radius of the circular puck 42. The support frame 46 is mounted on a substrate 48 (e.g., a printed circuit board). The sense system 14 is supported underneath the puck 42 on the substrate 48.

In operation, the puck 42 moves freely within the operational zone 44 in response to the application of a lateral force (i.e., a force with a component in the x-y plane shown in FIG. 2A) by the user's finger 26. The puck 42 is slidable over the sense system 14 on a support surface 50, which may be a low-friction, electrically insulating top layer of the sense system 14. In some embodiments, the puck 42 is constrained to two-dimensional movement within the operational zone 44.

In some embodiments, a magnetic mechanism constrains the puck 42 to two-dimensional movement on the support surface 50. For example, in some exemplary embodiments, the puck 42 is magnetically attracted to the support structure 50. In these embodiments one or both of the puck 42 and the support structure 50 may include a respective permanent magnet.

Figure 3:
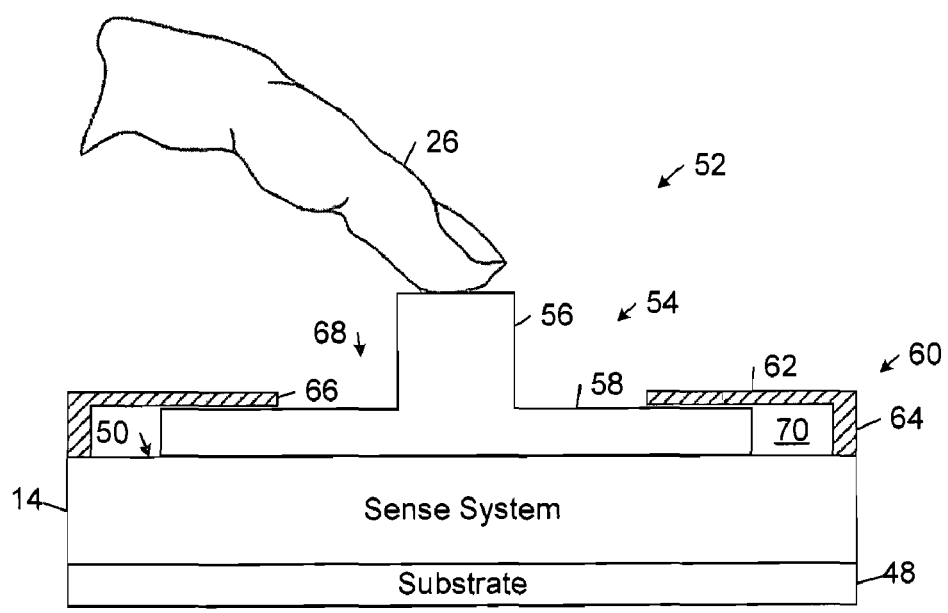
FIG. 3 is a sectional view of an embodiment of the pointing device shown in FIG. 1.

In other embodiments, a mechanical mechanism constrains the puck 42 to two-dimensional movement on the support surface 50. For example, FIG. 3 shows an embodiment 52 of the pointing device 40 shown in FIG. 2B in which the displaceable member includes a handle 56 and a base 58, and the support frame 46 is implemented by a housing 60 that includes a top 62 and sidewalls 64. The top 62 includes sidewalls 66 that define an opening 68 through which the handle 56 protrudes. The operational zone of the displaceable member 54 typically is defined by the range of motion of the handle 56 within the opening 68. The base 58 of the displaceable member 54 is free to slide laterally within a cavity 70 that is formed between the sidewalls 64 and the top 62 of the housing 60. In this way, the housing 60 constrains the displaceable member 54 to two-dimensional movement on the support surface 50.

In some embodiments, the sense system 14 includes regional sense electrodes in respective regions of the operational zone and at least one drive electrode. In some of these embodiments, at least one of the regional sense electrodes includes discrete electrically conducting sensing elements distributed across a respective one of the regions of the operational zone, and the drive electrode includes discrete electrically conducting sensing elements interspersed among the sensing elements of the at least one regional sense electrode.

Figure 4A:
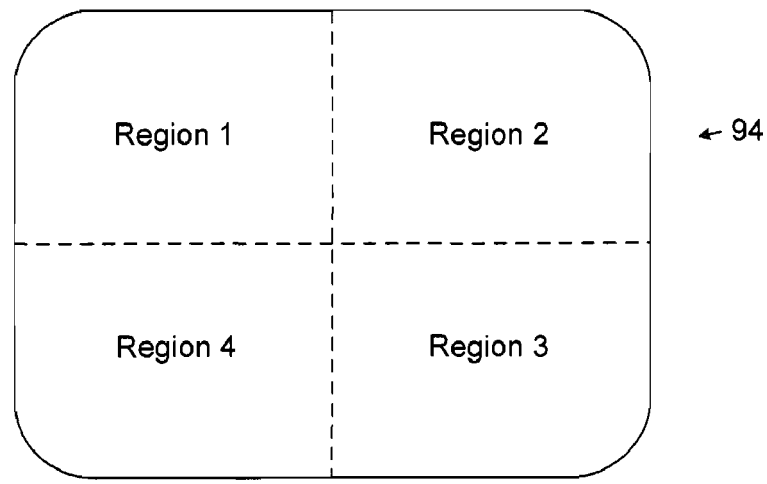
FIG. 4A is a diagrammatic top view of an embodiment of an operational zone.
Figure 4B:
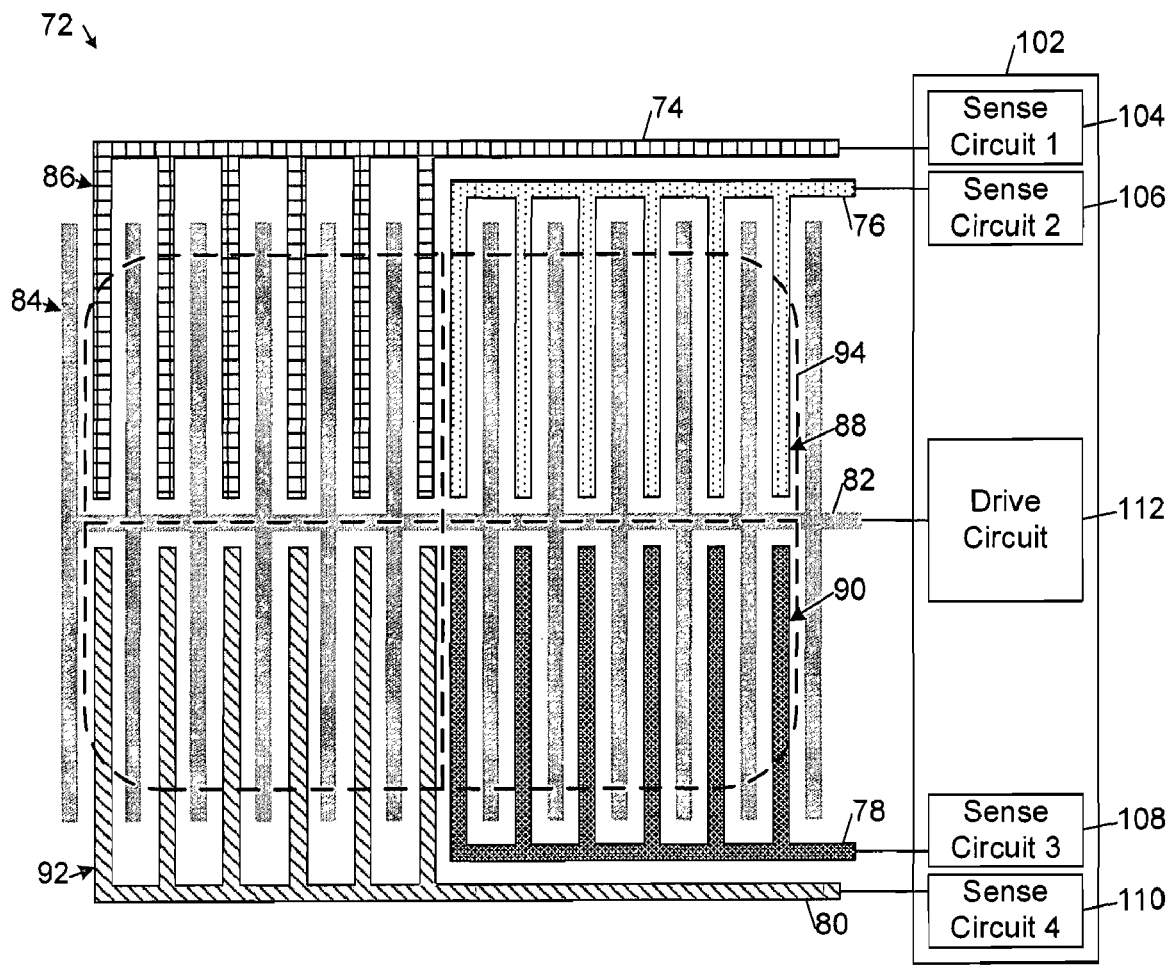
FIG. 4B is a top view of an embodiment of a sense system that includes a spatial arrangement of sense electrodes and at least one drive electrode coupled to an embodiment of the measurement system shown in FIG. 1.

FIGS. 4A and 4B show an embodiment of an operational zone 94 and an embodiment 72 of the sense system 14 that includes four regional sense electrodes 74, 76, 78, 80 and a drive electrode 82. The drive electrode 82 includes a pattern of electrode fingers 84 and each of the regional sense electrodes 74-80 includes a respective pattern of electrode fingers 86, 88, 90, 92. The electrode fingers 84 of the drive electrode 82 are distributed across the operational zone 94, which is shown in phantom over the patterns of electrode fingers 84-92 in FIG. 4B. The electrode fingers 86-92 of the regional sense electrodes 74-80 are located in respective regions of the operational zone 94. In particular, the electrode fingers 86 of the regional sense electrode 74 are located in Region 1, the electrode fingers 88 of the regional sense electrode 76 are located in Region 2, the electrode fingers 90 of the regional sense electrode 78 are located in Region 3, and the electrode fingers 92 of the regional sense electrode 80 are located in Region 4.

The electrode fingers 86-92 of the regional sense electrodes 74-80 typically are arranged in a regular array that provides a uniform density of electrode fingers across the respective regions of the operational zone 94. In the sense system 72, the electrode fingers 84 of the drive electrode 82 are interspersed among the electrode fingers 86-92 of the regional sense electrodes 74-80. In particular, the electrode fingers 86-92 of the regional sense electrodes 74-80 are interdigitated with the electrode fingers 84 of the drive electrode 82 to form an alternating electrode finger array in which electrode fingers 84 of the drive electrode 82 are interposed between the electrode fingers 86-92 of the regional sense electrodes 74-80 in each of the regions of the operational zone 94.

In the illustrated embodiment, the sense electrodes 74-82 are arranged on a planar surface of the substrate 48 (see FIG. 2B). In other embodiments, the sense electrodes 74-82 are arranged on one or more curved (e.g., convex or concave) surfaces of the substrate 48.

Figure 5:
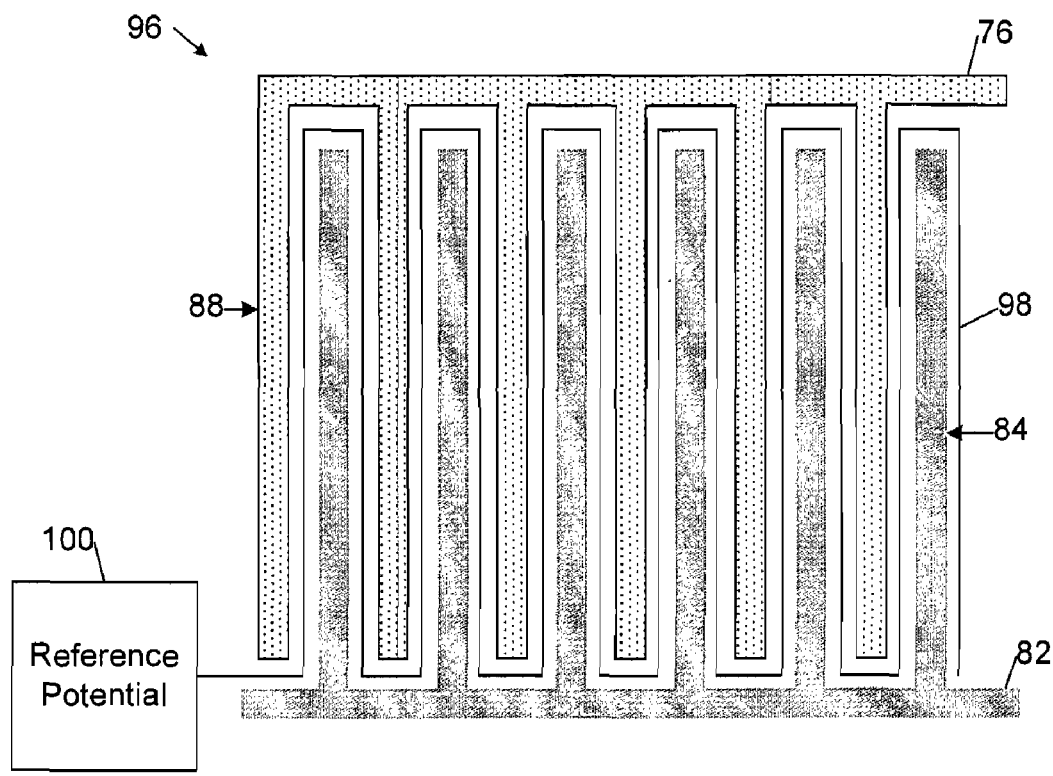
FIG. 5 is a top enlarged view of a portion of an embodiment of a sense system that includes a noise-shielding electrical conductor between interdigitated electrode fingers of a regional sense electrode and a drive electrode.

FIG. 5 shows a portion of an embodiment 96 of the sense system 72 that additionally includes at least one noise-shielding electrical conductor between the electrode fingers 86-92 of the regional sense electrodes 74-80 and adjacent ones of the electrode fingers 84 of the drive electrode 82. In the portion of the sense system 96 shown in FIG. 5, a noise-shielding electrical conductor 98 is interposed between the electrode fingers 84 of the drive electrode 82 and the electrode fingers 88 of the regional sense electrode 76. The noise-shielding electrical conductor 98 is connected electrically to a reference electrical potential 100, which typically is electrical ground potential. The noise-shielding electrical conductor 98 reduces direct capacitive coupling between the regional sense electrodes 74-80 and the drive electrode 82 and, thereby, reduces noise.

In the embodiment illustrated in FIG. 4B, the sense electrodes 74-82 are connected to an embodiment 102 of the measurement system 16. In particular, each of the regional sense electrodes 74-80 is connected to a respective sense circuit 104, 106, 108, 110 and the drive electrode 82 is connected to a drive circuit 112. The drive circuit 112 applies input signals to the drive electrode 82 and the sense circuits 104-110 measure sense signals that indicate the amounts of overlap between the conductive coupling element and ones of the sense electrodes.

In other embodiments, at least one drive circuit applies the input signals 28 to the regional sense electrodes 74-80 and a sense circuit measures the sense signals 30 produced at the drive electrode.

Figure 6:
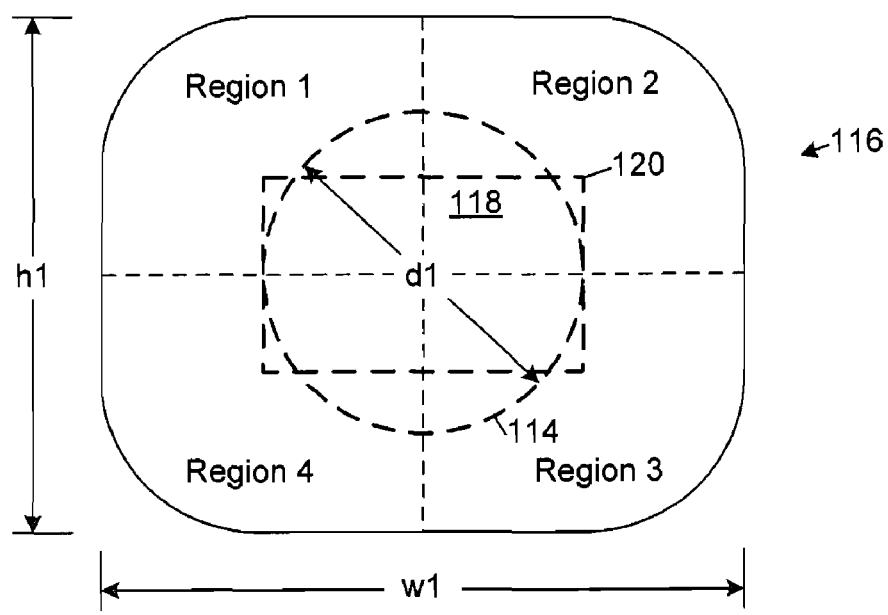
FIG. 6 is a diagrammatic top view of an embodiment of a conductive coupling element superimposed over an embodiment of an operational zone.

FIG. 6 shows an embodiment of a conductive coupling element 114 superimposed over an embodiment 116 of the operational zone 94 (see FIGS. 4A and 4B). The conductive coupling element 114 typically has a spatial extent such that movement of the conductive coupling element 114 from any location in the operational zone 116 to any other location in the operational zone 116 causes the conductive coupling element 114 to overlap at least two of the regional sense electrodes, which are located in respective ones of the demarcated regions of the operational zone 116 (i.e., Regions 1-4). Sizing the conductive coupling element 114 in relation to the operational zone 116 in this way avoids indeterminate movements of the displaceable member in the operational zone 116.

Although the conductive coupling element 114 is free to move across the entire operational zone 116, the resolvable portion of this movement is limited to an active area 118 with boundaries 120 that correspond to the locations of the centroid of the conductive coupling element 114 as it moves in contact with the periphery of the operational zone 94. In some embodiments, the active area 118 has a size that is set based on a specified pixel resolution of the display 24 and a specified navigation resolution, which typically determines the amount of control the user must exercise over the movement of the displaceable member in order to achieve pixel-to-pixel control of the cursor 25 on the displace 24 (see FIG. 1).

For example, in one exemplary embodiment, the specified display resolution is XGA 1024×768 pixels and the specified navigation resolution is 819 dpi (dots per inch). Dividing the screen resolution by the navigation resolution yields an active area with a width of 1024/819=1.25 inches and a height of 768/819=0.94 inches. In this exemplary embodiment, the operational zone has a width (w1) of 2.5 inches and a height (h1) of 2.19 inches. In this example, the diameter (d1) of the conductive coupling element 114 is equal to the larger one of the width and the height of the active area 118 (i.e., 1.25 inches).

In general, the size of the operational zone and the size of the conductive coupling element can be adjusted for a given screen resolution by adjusting the navigation resolution. One potential drawback to high navigation resolution is increased difficulty of control for the user as small motions of the puck translate to larger travel of the cursor 25 on the display 24. In some cases, the size of the operational zone may be reduced while maintaining the same navigation resolution by increasing the number of regional sense electrodes, as shown in FIG. 7.

Figure 7:
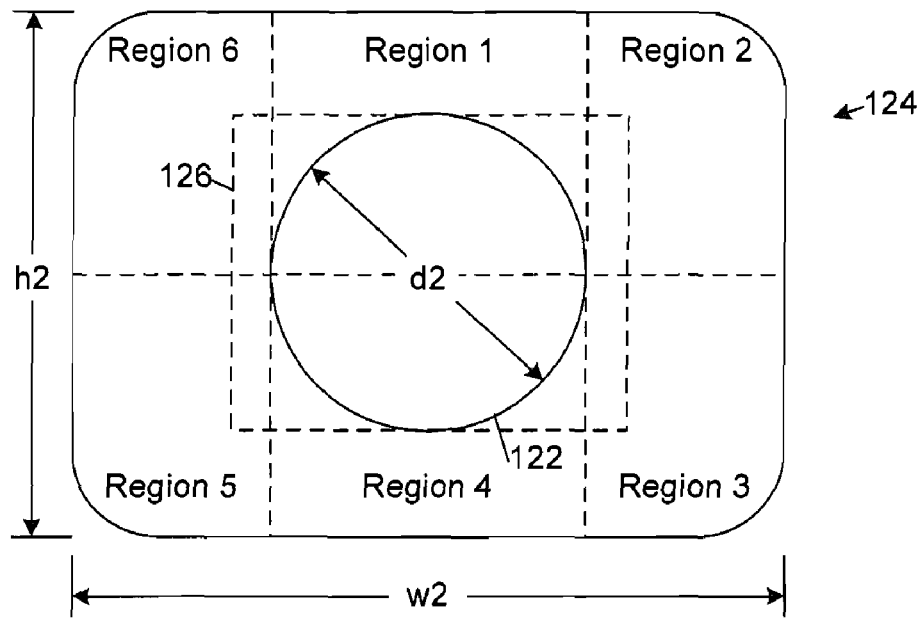
FIG. 7 is a diagrammatic top view of an embodiment of a conductive coupling element superimposed over an embodiment of an operational zone.

FIG. 7 shows an embodiment 122 of the conductive coupling element 114 superimposed over an operational zone embodiment 124 that is divided into six regions. In an exemplary embodiment in which the specified display resolution is XGA 1024×768 pixels and the specified navigation resolution is 819 dpi, the active area 126 has the same dimensions as the example described above (i.e., a width of 1024/819=1.25 inches and a height of 768/819=0.94 inches) but the areas of the operational zone 124 and the conductive coupling element 122 are reduced 25% and 43%, respectively. In particular, the height (h2) of the operational zone 124 is 0.94+0.94=1.88 inches, the width (w2) of the operational zone 124 is 0.94+1.25=2.19 inches, and the diameter (d2) of the conductive coupling element 122 is 0.94 inches.

Figure 8:
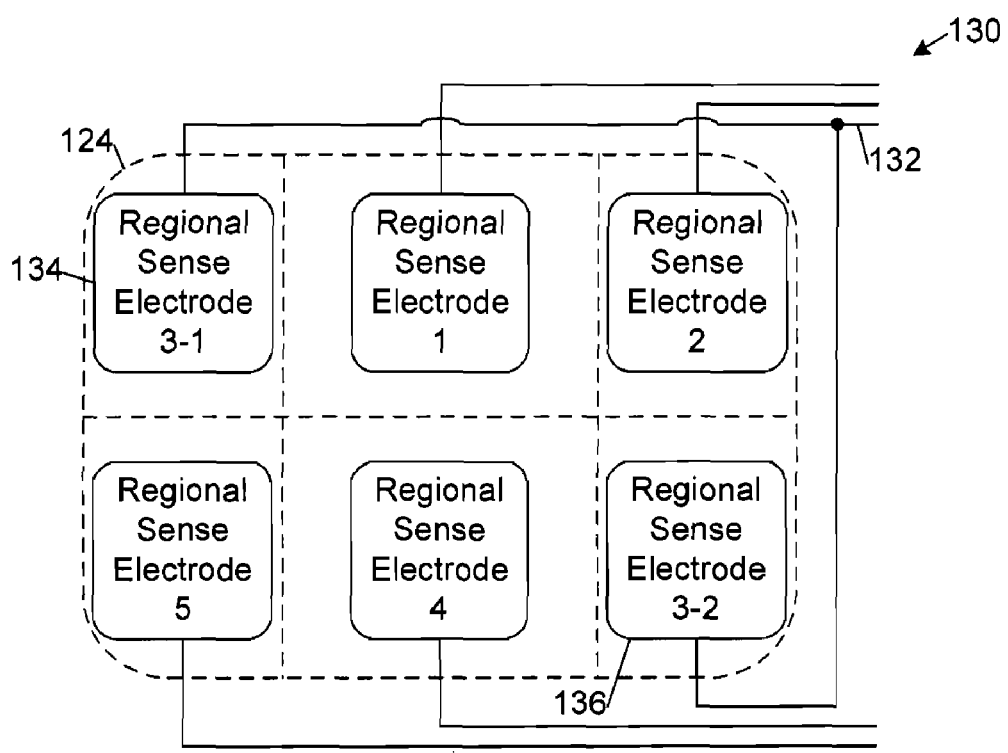
FIG. 8 is a diagrammatic top view of the operational zone embodiment shown in FIG. 7 superimposed over an embodiment of a sense system.

In some embodiments, at least one of the regional sense electrodes is divided into at least two electrode structures located in different respective operational zone areas that are separated from one another by respective ones of the other regional sense electrodes. For example, FIG. 8 shows the operational zone 124 in phantom superimposed on an embodiment of a sense system 130 that includes a spatial arrangement of sense electrodes. In this arrangement, a regional sense electrode 132 is divided into two regional sense electrode structures 134, 136 (i.e., Regional Sense Electrodes 3-1 and 3-2) that are located in different respective areas (i.e., areas under Region 3 and Region 6 of the operational zone 124) of the spatial arrangement, areas which are separated from one another by respective ones of the other regional sense electrodes (i.e., Regional Sense Electrodes 1 and 4).

In embodiments of the type shown in FIG. 8, the maximum extent of overlap of the conductive coupling element with the regional sense electrodes is at most equal to a shortest one of distances separating all pairs of the electrode structures of each of the divided regional sense electrodes.

Figure 9A:
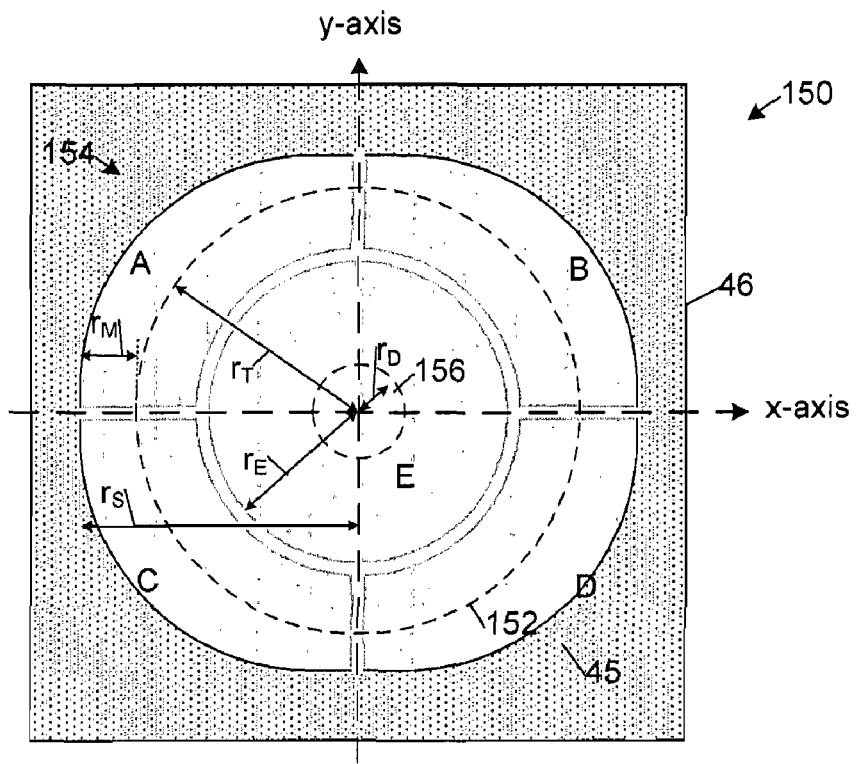
FIGS. 9A and 9B are top views of an embodiment of a conductive coupling element shown in phantom at different respective positions over an embodiment of the sense system shown in FIG. 1.
Figure 9B:
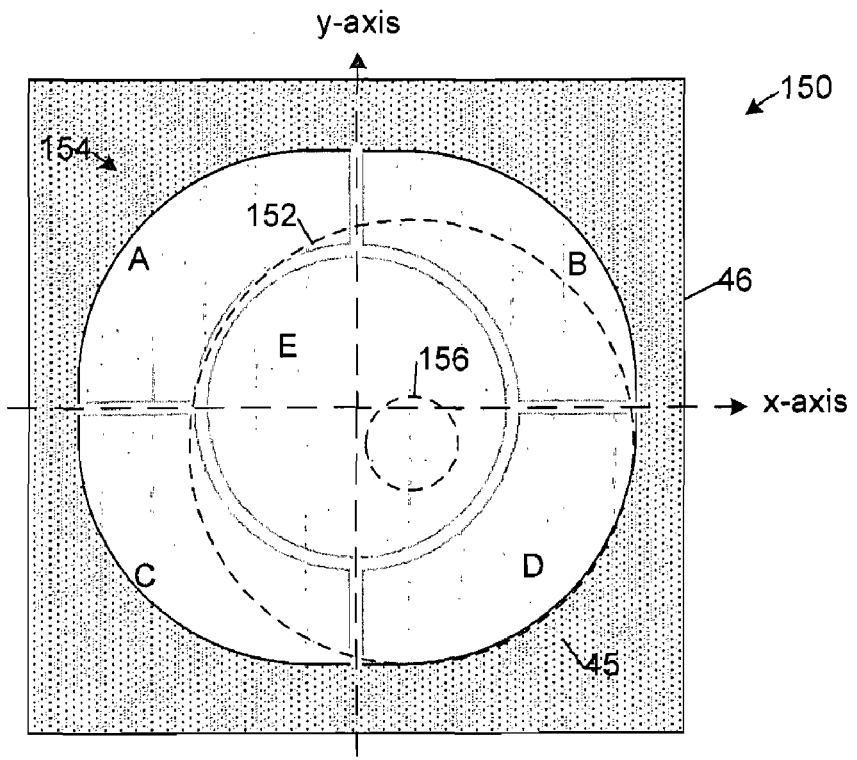

FIGS. 9A and 9B show top views of an exemplary embodiment 150 of the pointing device 40 (see FIG. 2B) that includes a conductive coupling element 152 (shown in phantom by the dashed circle) and a sense system 154 that includes four peripheral sense electrodes A, B, C, and D in a peripheral region surrounding a drive electrode E. In the illustrated embodiment, the sense system 154 is arranged on a planar surface of the substrate 48 (see FIG. 2B). In other embodiments, the sense system 154 may be arranged on one or more curved (e.g., convex or concave) surfaces of the substrate 48. The electrodes A-E are electrically isolated from one another. Electrical connections (not shown) electrically connect the electrodes A-E to the measurement system 16 (see FIG. 1). In some embodiments, a low-friction dielectric spacer, which is located between the conductive coupling element 152 and the electrodes A-E, electrically insulates the conductive coupling element 152 from the electrodes A-E while allowing the conductive coupling element 152 to slide over the electrodes A-E. The amount of overlap between the conductive coupling element 152 and each of electrodes A-E depends on the position of the puck 42 in relation to the electrodes A-E.

FIG. 9A shows the conductive coupling element 152 centered over the drive electrode E. FIG. 9B shows the conductive coupling element 152 positioned against the outer wall 45 of the operational zone. In this embodiment, conductive coupling element 152 completely overlaps the drive electrode E in each position of the displaceable member in the operational zone. That is, the radius $r_T$ of the conductive coupling element 152 is at least the radius $r_E$ of the drive electrode plus the maximal range of motion $r_M$ of the target electrode from the center of the operational zone (i.e., $r_T \geq r_E + r_M$). In addition, the electrodes A-E extend across a sense region that completely overlaps the conductive coupling element 152 in each position of the puck 42 in the operational zone.

The conductive coupling element 152 includes a peripheral conductive coupling element surrounding and electrically connected to a central conductive coupling element that includes a displaceable coupling member 156 (shown in phantom by the dashed circle). The displaceable coupling member 156 is movable towards and away from the sense system 154 substantially independently of the surrounding peripheral conductive coupling element. The drive electrode E completely overlaps the displaceable coupling member 156 in each position of the puck 42 in the operational zone. That is, the radius $r_E$ of the drive electrode is at least the radius $r_D$ of the displaceable coupling member 156 plus the maximal range of motion $r_M$ of the conductive coupling element from the center of the operational zone (i.e., $r_E \geq r_D + r_M$).

Figure 10:
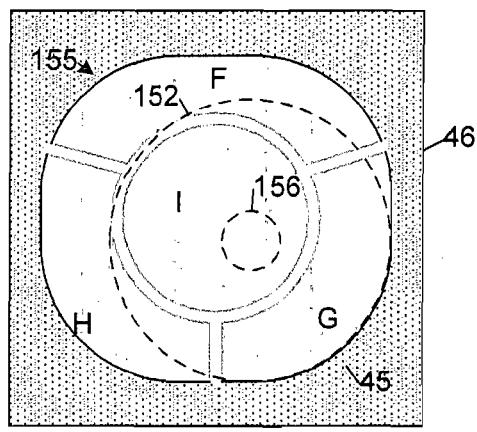
FIG. 10 is a top view of an embodiment of a conductive coupling element shown in phantom over an embodiment of the sense system shown in FIG. 1.

In the embodiment shown in FIGS. 9A and 9B, the sense system 154 includes four peripheral sense electrodes A-D surrounding a single drive electrode E, and the conductive coupling element 152 includes a peripheral conductive coupling element surrounding a single central conductive coupling element 156. In other embodiments, the sense system 154 may include a different number of peripheral sense electrodes. For example, FIG. 10 shows a sense system 155 that includes three peripheral sense electrodes F, G, H surrounding a drive electrode I.

Figure 11A:
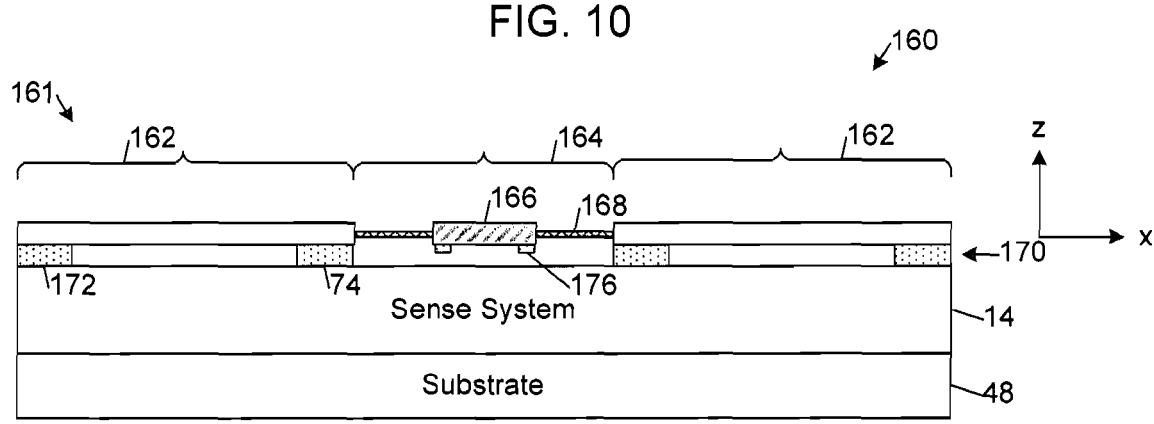
FIG. 11A is a diagrammatic sectional view of an embodiment of the pointing device of FIG. 1 that includes an embodiment of a conductive coupling element that has a displaceable coupling member.
Figure 11B:
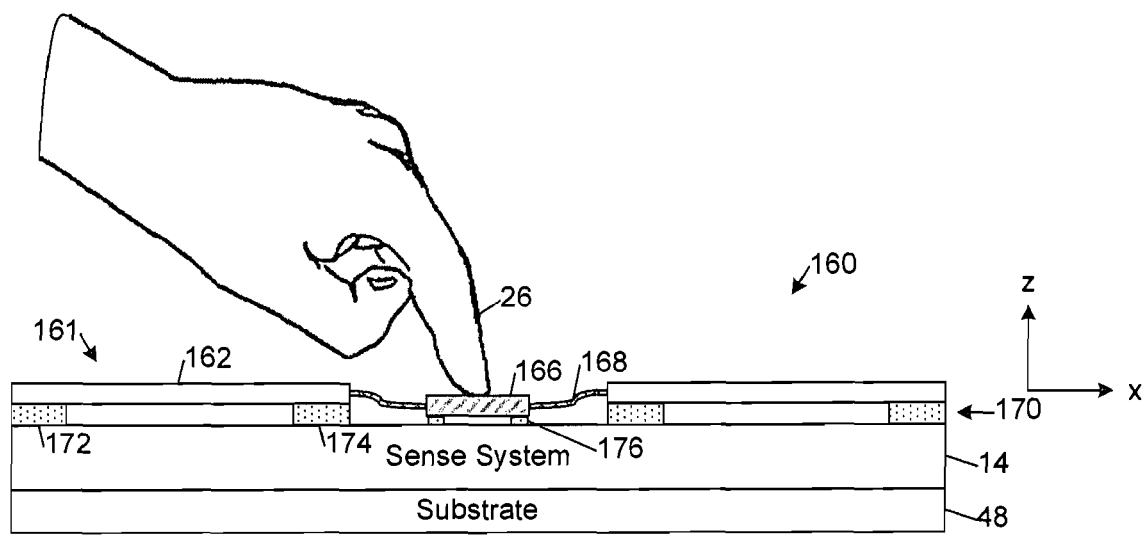
FIG. 11B is a diagrammatic sectional view of the pointing device shown in FIG. 11A in which the displaceable coupling member has been moved against the sense system in response to a vertical force applied by a user's finger.

FIG. 11A shows an embodiment 160 of the pointing device 40 that includes an embodiment 161 of the conductive coupling element 152 (shown in FIGS. 9A and 9B) that includes a planar arrangement of a peripheral conductive coupling element 162 surrounding a central conductive coupling element 164. The central conductive coupling element 164 includes a displaceable coupling member 166 that is connected to the peripheral conductive coupling element 162 by a resilient restoring mechanism 168. The restoring mechanism 168 urges the displaceable coupling member 166 towards an equilibrium position in response to application of an external force to the displaceable coupling member. For example, in one exemplary illustration, FIG. 11B shows the displaceable coupling member 166 moved from the equilibrium position shown in FIG. 11A and against the sense system 14 in response to a force applied by the user's finger 26. FIG. 11B shows the user's finger 26 in contact with the displaceable coupling member 166 for illustrative purposes only. In actual embodiments, the user's finger 26 is electrically insulated from the displaceable coupling member 166 by other components of the pointing device 10. The force that is applied by the user's finger 26 deforms the restoring mechanism 168 and, in response, the restoring mechanism 168 applies a restoring force that opposes the applied force and urges the displaceable coupling member 166 towards the equilibrium position. Upon the removal of the force applied by the user's finger 26, the unopposed restoring force exerted by the restoring mechanism 168 returns the displaceable coupling member 166 to the equilibrium position.

As shown in FIGS. 11A and 11B, a dielectric spacer 170 is between the conductive coupling element 161 and the sense system 14. In this embodiment, the dielectric spacer 170 includes discrete dielectric films 172, 174, 176 that are attached to respective spaced apart surface areas of the conductive coupling element 161 facing the sense system 14. Respective ones of the discrete dielectric films 172-176 are attached to peripheral surface areas of the conductive coupling element 161 and at least one central surface area of the conductive coupling element 161. The dielectric films 172-176 are free to slide over surfaces of the sense system 14. In some embodiments, the dielectric strips 172-176 are formed of a low-friction dielectric material (e.g., a plastic material, such as nylon and TEFLON®), which is bonded to the respective surface areas of the conductive coupling element 161.

The use of multiple discrete dielectric films as opposed to a single uniform dielectric film allows the target electrode to better conform to any surface irregularities on the sense system. In addition, the dielectric spacer 170 reduces the sensitivity of the sense system to variations in the gap separating the conductive coupling element and the sense electrode structure by increasing the permittivity between the conductive coupling element and the sense system in relation to the permittivity of air.

In the illustrated embodiment, the dielectric films 172-176 are ring-shaped. In other embodiments, the dielectric spacer 170 may include dielectric films with shapes and sizes that are different from the dielectric films 172-176. For example, in some embodiments, the dielectric spacer 170 includes a thin film of a dielectric material (e.g., TEFLON®) that coats the entire bottom-facing surface of the conductive coupling element 152 and prevents the displaceable coupling member 166 from electrically shorting the drive electrode. The dielectric spacer 170 additionally includes the two ring-shaped dielectric films 172, 174 adhered to the exposed surface areas of the thin film dielectric coating. The thin film dielectric coating typically has a uniform thickness in the range of 25-100 micrometers (μm) and the two ring-shaped dielectric films 172, 174 typically have thicknesses in the range of 100-300 μm.

In some embodiments, the risk of electrical shorting between the conductive coupling elements 152, 161 and the sense system 154 additionally is reduced by adhering a thin (e.g., on the order of 100 μm) dielectric coating to the exposed top surfaces of the sense system 154.

Figure 12A:
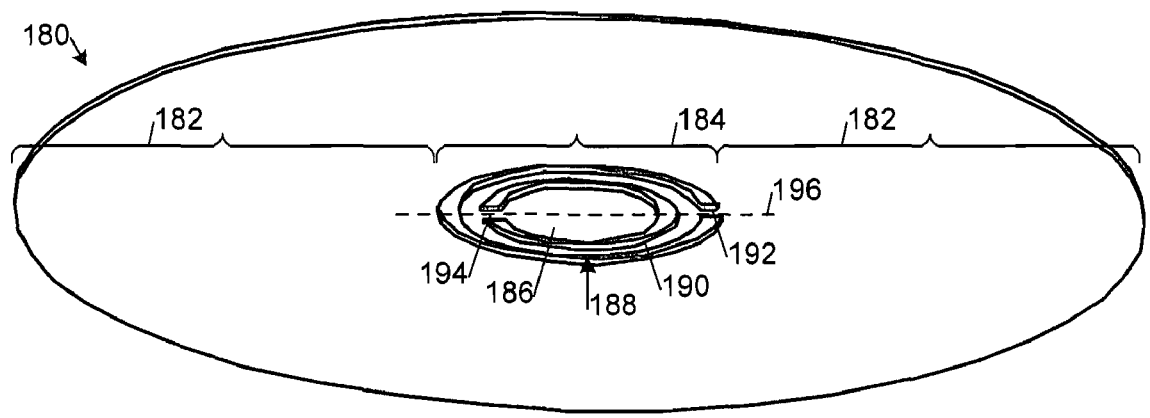
FIGS. 12A and 12B respectively are a top view and a bottom view of an embodiment of a conductive coupling element that includes a peripheral conductive coupling element surrounding a central conductive coupling element that includes a displaceable coupling member.
Figure 12B:
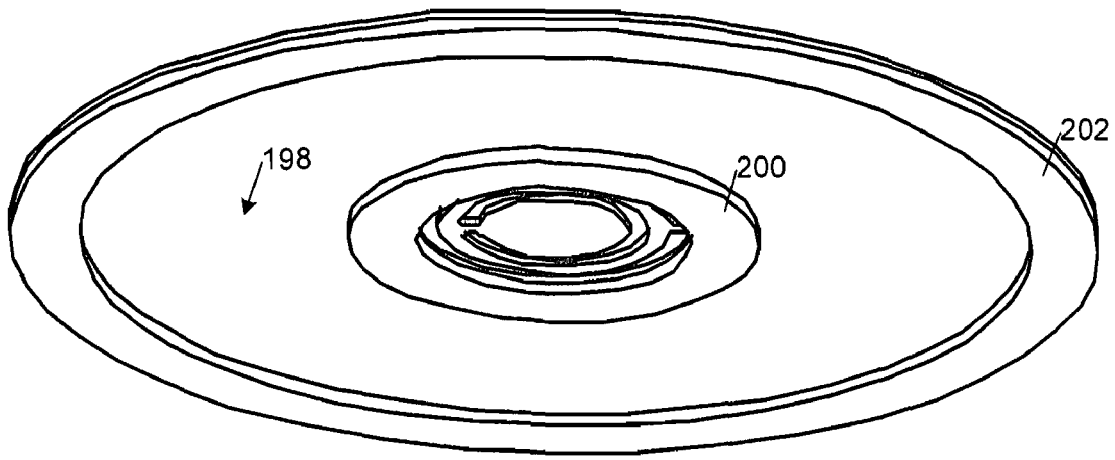

FIG. 12A shows a top view of an exemplary embodiment 180 of the planar conductive coupling element 161 (shown in FIGS. 11A and 11B). The conductive coupling element 180 includes a ring-shaped peripheral conductive coupling element 182 surrounding a central conductive coupling element 184. The central conductive coupling element 184 includes a displaceable coupling member 186 that is connected to the peripheral conductive coupling element 182 by a planar restoring mechanism 188. The restoring mechanism 188 includes a ring 190 that is connected to the peripheral conductive coupling element 182 and the displaceable coupling member 186 by respective flexible linkages 192, 194, which are aligned with an axis 96 that bisects the displaceable coupling member 186. Referring to FIG. 12B, the conductive coupling element 180 includes an optional uniform thin film 198 of dielectric material that coats the bottom surfaces of the conductive coupling element and two ring-shaped dielectric films 200, 202 that are adhered to respective bottom surface areas of the thin film dielectric coating 198. In some embodiments, the planar conductive coupling element 180 is cut out of a sheet of electrically conducting material (e.g., a metal) using a stamp or a die.

Figure 13:
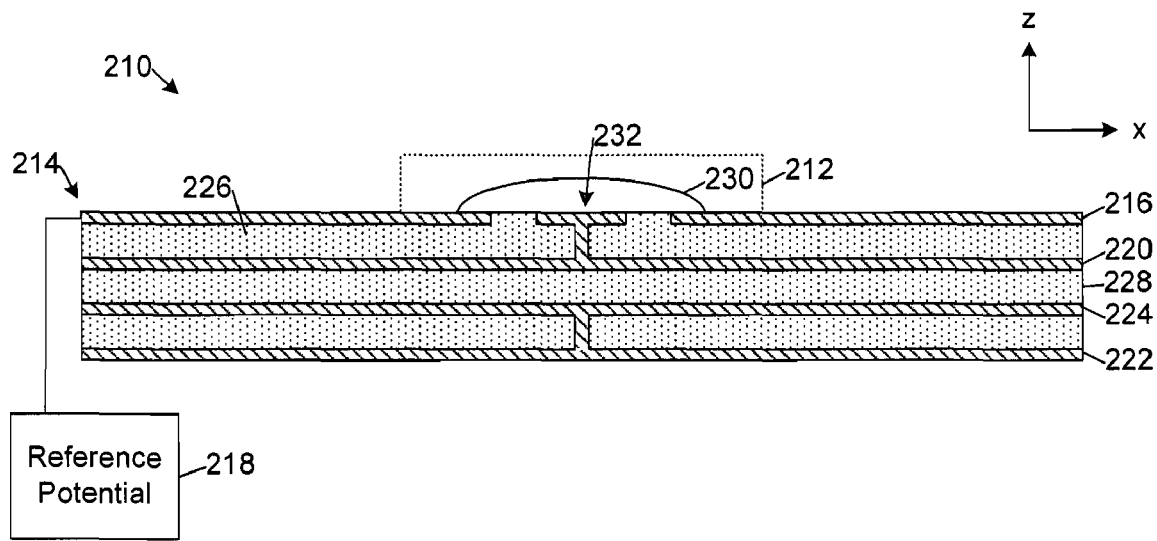
FIG. 13 is a diagrammatic sectional view of an embodiment of the displaceable member shown in FIG. 1.

FIG. 13 shows an embodiment 210 of the displaceable member 12 shown in FIG. 1. The displaceable member 210 includes an input button 212 and a conductive coupling element 214. The conductive coupling element 214 includes a first electrical conductor 216 connected to a reference electrical potential 218 (typically electrical ground potential), a second electrical conductor 220 electrically insulated from the first electrical conductor 216, and an interconnected pair of planar electrical conductors 222, 224. A first dielectric layer 226 electrically insulates the first electrical conductor 216 from the second electrical conductor 220. A second dielectric layer 228 electrically insulates the second electrical conductor 220 from the pair of electrical conductors 222, 224.

A switch 230 in the input button 212 is electrically connected to the electrical conductor 216. The switch 230 is operable to selectively connect the first electrical conductor 216 to the second electrical conductor 220. In the illustrated embodiment, the switch 230 is implemented by a resilient and electrically conducting dome switch that has a peripheral portion electrically connected to the first electrical conductor 216. The dome switch 230 has a relaxed (or equilibrium) state (shown in FIG. 13) in which a central portion is out-of-contact with a contact structure 232, which is connected electrically to the second electrical conductor 220. In response to a sufficient downward vertical force (i.e., a force directed in the negative z-direction) applied by a user's finger, the dome switch 230 transitions to a deformed biased state in which the central portion contacts the contact structure 232 and thereby electrically connecting the first electrical conductor 216 to the second electrical conductor 220. In this state, the capacitive coupling between the conductive coupling element 210 and underlying ones of the electrodes of the sense system is reduced because a portion of the capacitive coupling signal is drained by the source of the reference electrical potential 218. When the user's finger is lifted off the input button 212, the dome switch 230 resiliently returns to the relaxed state shown in FIG. 13 and thereby disconnects the second electrical conductor 220 from the source of the reference potential 218.

III. EXEMPLARY EMBODIMENTS OF THE MEASUREMENT CIRCUIT AND THE PROCESSING SYSTEM

A. Overview

The following exemplary pointing device methods are described in the context of the pointing device 150 (shown in FIGS. 9A and 9B). In analogous ways these methods also apply to the other pointing device embodiments that are described herein. As shown in FIG. 9A, the sense system 154 in this embodiment includes four peripheral sense electrodes A-D surrounding a single drive electrode E, and the conductive coupling element 152 includes a peripheral conductive coupling element surrounding a single central conductive coupling element 156.

Figure 14:
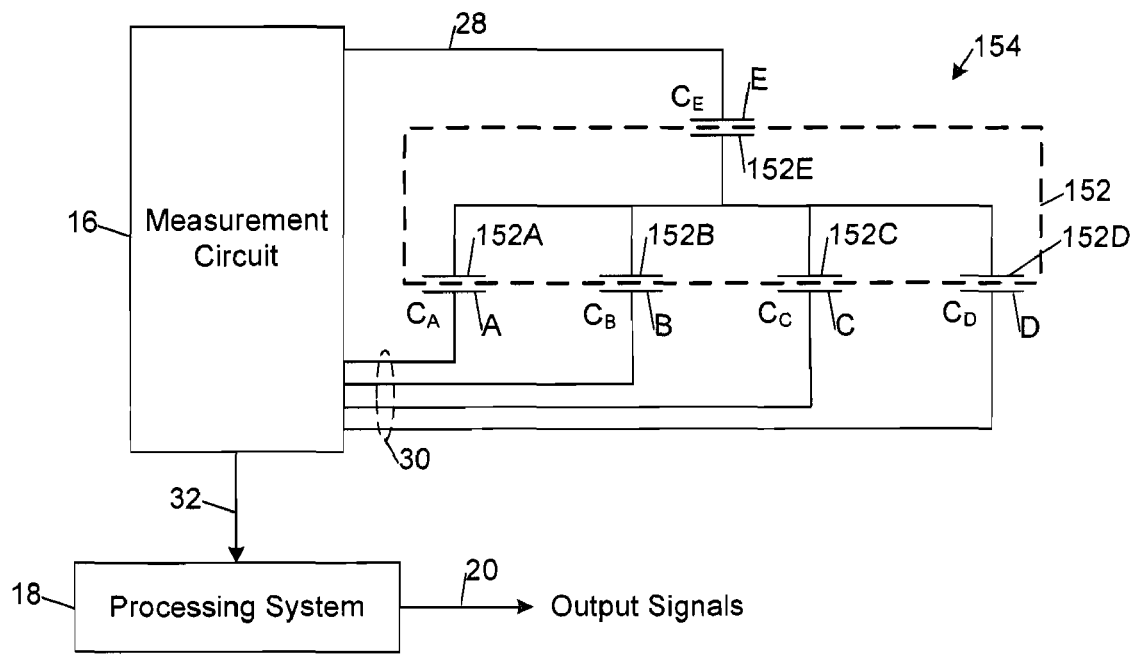
FIG. 14 is a block diagram of an embodiment of a processing system and an embodiment of a measurement circuit that is electrically connected to an equivalent circuit of the conductive coupling element and the sense system shown in FIGS. 9A and 9B.

FIG. 14 is a block diagram of an equivalent circuit of the conductive coupling element 152 and the sense system 154. The respective portions of the conductive coupling element 152 that overlap the electrodes A-E form respective parallel plate capacitors having capacitances that are proportional to the corresponding overlap amounts. Since all of the capacitors share portions of the conductive coupling element 152, the equivalent circuit includes five capacitors $C_A$, $C_B$, $C_C$, $C_D$, $C_E$ that are connected to the common conductive coupling element 152, which has respective portions identified by reference numbers 152A, 152B, 152C, 152D, 152E. In the illustrated embodiment, the input signals 28 are applied across respective pairings of the drive electrode E and respective ones of the peripheral sense electrodes A-D. Therefore, the equivalent circuit includes the capacitance $C_E$ of the drive electrode E coupled in series with the parallel capacitances $C_A$, $C_E$, $C_C$, $C_D$ of the peripheral sense electrodes A-D.

In a given measurement cycle, the measurement circuit 16 generates a respective measurement value 32 for each of the peripheral sense electrodes A-D. The input signals 28 may be driven through the drive electrode E and the measurements made at the output terminals of the peripheral sense electrodes A-D. Alternatively, the input signals 28 may be driven through each of the peripheral sense electrodes A-D and the measurements made at the output terminal of the drive electrode E in a time multiplexed manner. The conductive coupling element 152 capacitively couples the applied input signals from the measurement system 16 across the corresponding pairs of the drive electrode E and the respective ones of the peripheral sense electrodes A-D. In response to the applied input signals, the sense system 154 produces sense signals 30 that are responsive to a touching of the displaceable member 12 by the user's finger and to different positions of the displaceable member 12 in the operational zone. In particular, each of the measurement values that is generated by the measurement system 16 is indicative of a respective degree of overlap between the conductive coupling element 152 and the corresponding peripheral sense electrode. In addition, the combination of the measurement values that are generated during a given measurement cycle is indicative of the vertical (or z-axis) force that is applied to the displaceable member.

The processing system 18 produces the output signals 20 from the measurement values 32. In this process, the processing system 18 determines the position of conductive coupling element 152 in relation to the peripheral sense electrodes A-D based on the measurement values 32.

B. Exemplary Measurement Circuit Embodiments

Figure 15:
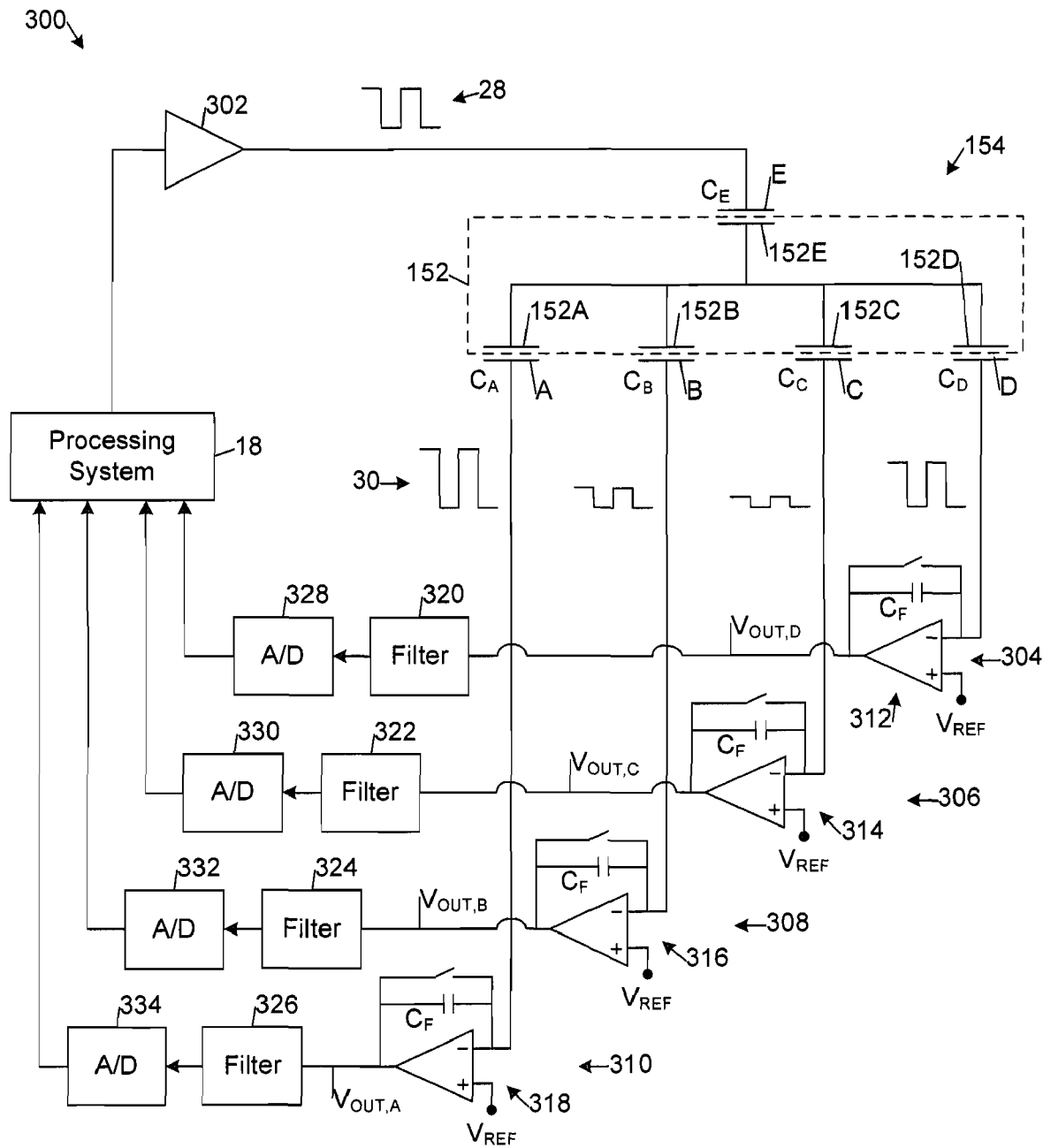
FIG. 15 is a circuit diagram of an embodiment of the measurement circuit shown in FIG. 1.

FIG. 15 shows an embodiment 300 of the measurement circuit 16. The measurement circuit 300 includes a drive amplifier 302 and a respective measurement circuit 304, 306, 308, 310 connected to the output terminal of each of the peripheral sense electrodes A-D. The drive amplifier 302 drives the input signals 28 through the drive electrode E. In the illustrated embodiment, the input signals 28 are square wave pulses. Each of the measurement circuits 304-310 includes a respective integrator 312, 314, 316, 318, a respective filter 320, 322, 324, 326, and a respective analog-to-digital (A/D) converter 328, 330, 332, 334. Each of the integrators 312-318 includes a respective positive input terminal that is connected to a reference voltage ($V_{REF}$) and a respective negative terminal that is connected to the corresponding output terminal through a respective negative feedback loop that includes a feedback capacitor $C_F$ and a reset switch. Each of the filters 320-326 filters the output of a respective one of the integrators 312-318. Each of the analog-to-digital converters 328-334 samples the filtered signals output from a respective one of the filters 320-326. The processing system 18 receives the digital measurement values generated by the analog-to-digital converters 328-334.

Figure 16:
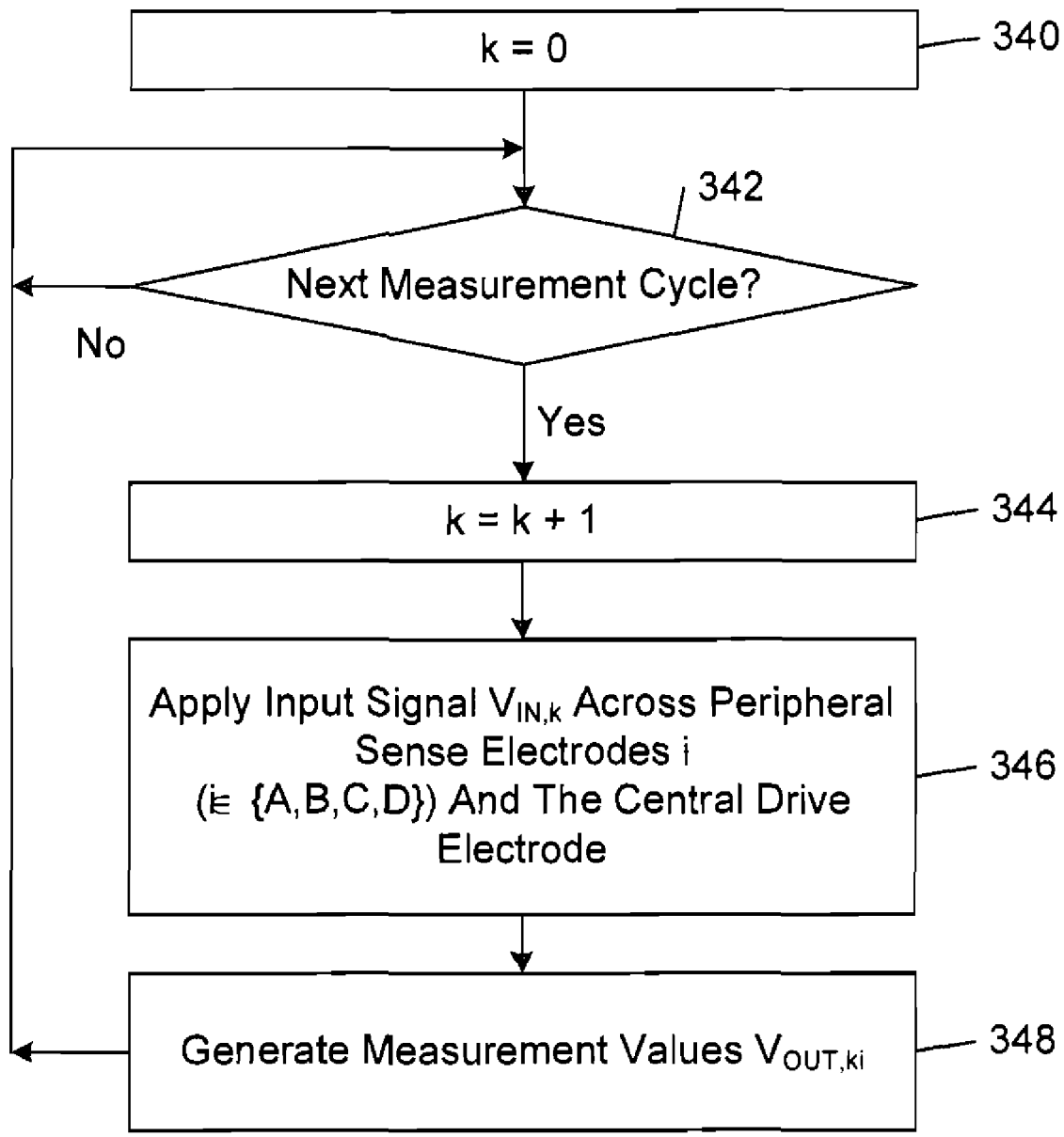
FIG. 16 is a flow diagram of an embodiment of a method of obtaining measurement values using the sense system shown in FIGS. 9A and 9B.

FIG. 16 shows an embodiment of a method in accordance with which the measurement system 16 generates the measurement values 32. In accordance with this embodiment, the measurement cycle index k optionally is initialized to 0 (FIG. 16, block 340). At the beginning of each measurement cycle (FIG. 16, block 342), the measurement cycle index is incremented by 1 (FIG. 16, block 344). The measurement circuit 16 applies the input signal $V_{IN,k}$ across the peripheral sense electrodes i (where i∈{A, B, C, D}) and the drive electrode E (FIG. 16, block 346). The measurement circuit 16 then generates the measurement values $V_{OUT,ki}$ (FIG. 16, block 348). The measurement circuit 16 then waits for the next measurement cycle before repeating the process (FIG. 16, block 342).

Thus, during each measurement cycle k, the processor 18 closes the reset switches of the integrators 312-318 and applies a square wave pulse with a magnitude $V_{IN,k}$ to the drive electrode E. The output terminals of each of the integrators 312-318 will generate a voltage $V_{OUT,k}$ that is given by equation (1):

$$V_{OUT,k} = \frac{C_{EQ,i}}{C_F} \cdot (V_{IN,k} - V_{REF}) + V_{REF} \tag{1}$$

where $C_F$ is the value of the feedback capacitors in the negative feedback loops of the integrators 312-318, $C_{EQ,i}$ is the equivalent series sum of the capacitance $C_E$ of the drive electrode E and the capacitance $C_i$ of a respective one of the peripheral sense electrodes A-D, and is given by equation (2).

$$C_{EQ,i} = \frac{C_i \cdot C_E}{C_i + C_E} \tag{2}$$

Equation (1) is rewritten in terms of $C_{EQ,i}$ in equation (3):

$$C_{EQ,i} = C_F \cdot \frac{(V_{OUT} - V_{REF})}{(V_{IN} - V_{REF})} = K_1 \cdot V_{OUT,i} + K_2 \tag{3}$$

where $K_1 = C_F/(V_{IN,i} - V_{REF})$ and $K_2 = C_F \cdot V_{REF}/(V_{IN,i} - V_{REF})$. Thus, since $V_{IN}$, $V_{REF}$, and $C_F$ are known, the measured output voltage $V_{OUT}$ gives the value of $C_{EQ,i}$.

In the embodiment illustrated in FIG. 15, the measurement circuit 300 drives the input signals 28 through the drive electrode E and measures the resulting sense signals 30 from the output terminals of the peripheral sense electrodes A-D. Other embodiments of the measurement circuit 16 (shown in FIG. 1) may drive the input signals 28 through each of the peripheral sense electrodes A-D and measure the resulting sense signals 30 from the output terminal of the drive electrode E in a time-multiplexed manner.

C. Exemplary Processing System Embodiments

Figure 17:
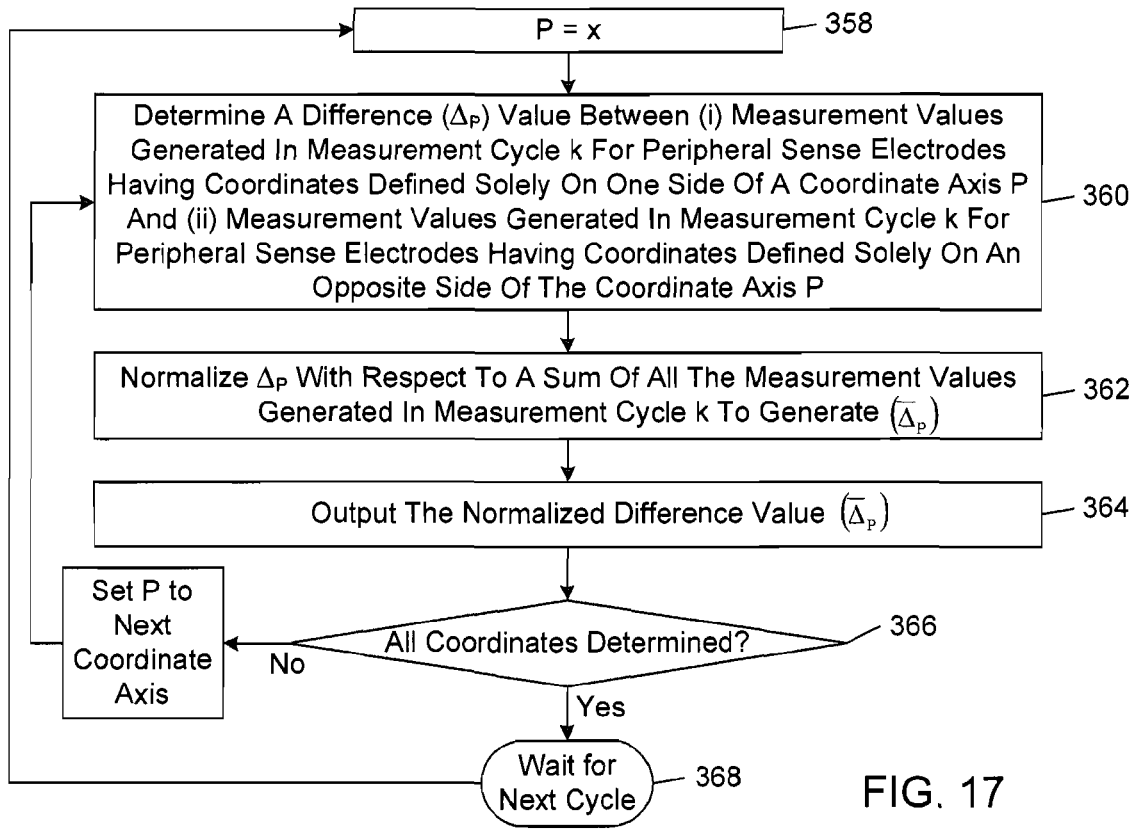
FIG. 17 is a flow diagram of an embodiment of a method of producing display control signals from the measurement values generated in accordance with the method of FIG. 16.

FIG. 17 shows an embodiment of a method in accordance with which the processing system 18 produces the display control signals 20 from the measurement signals 32. In accordance with this embodiment, the processing system 18 determines a difference value ($\Delta_P$) between (i) measurement values generated a given measurement cycle k for peripheral sense electrodes on one side of a coordinate axis P (e.g., P∈{x,y}) and (ii) measurement values generated in the given measurement cycle k for peripheral sense electrodes on an opposite side of the coordinate axis P (FIG. 13, block 360). The processing system 18 normalizes the difference value $\Delta_P$) with respect to a sum of all the measurement values generated in the given measurement cycle k to generate ($\overline{\Delta}_P$) (FIG. 17, block 362). The processing system 18 outputs the normalized difference value ($\overline{\Delta}_P$) (FIG. 17, block 364). If coordinates for all of the coordinate axes have not been determined (FIG. 17, block 366), the process is repeated for the next coordinate axis (FIG. 17, blocks 360-364). Otherwise, the processing system 18 waits for the next measurement cycle (FIG. 17, block 368) before repeating the process (FIG. 17, blocks 358-366).

Thus, with respect to the x-axis and the y-axis that are defined in FIG. 9A, the processing system determines the difference values $\Delta_x$ and $\Delta_y$ in accordance with equations (4) and (5):

$$\Delta_x = (C_{EQ,B} + C_{EQ,D}) - (C_{EQ,A} + C_{EQ,C}) \tag{4}$$
$$= K_1 \cdot (V_{OUT,B} + V_{OUT,D} - V_{OUT,A} - V_{OUT,C})$$

$$\Delta_y = (C_{EQ,A} + C_{EQ,B}) - (C_{EQ,C} + C_{EQ,D}) \tag{5}$$
$$= K_1 \cdot (V_{OUT,A} + V_{OUT,B} - V_{OUT,C} - V_{OUT,D})$$

The normalized difference values $\overline{\Delta}_x$ and $\overline{\Delta}_y$ are calculated in accordance with equations (6) and (7) under the assumption that $V_{REF}$ is set to zero potential:

$$\overline{\Delta}_x = \frac{(C_{EQ,B} + C_{EQ,D}) - (C_{EQ,A} + C_{EQ,C})}{C_{EQ,A} + C_{EQ,B} + C_{EQ,C} + C_{EQ,D}} \tag{6}$$
$$= \frac{(V_{OUT,B} + V_{OUT,D}) - (V_{OUT,A} + V_{OUT,C})}{V_{OUT,A} + V_{OUT,B} + V_{OUT,C} + V_{OUT,D}}$$

-continued $$\overline{\Delta}_y = \frac{(C_{EQ,A} + C_{EQ,B}) - (C_{EQ,C} + C_{EQ,D})}{C_{EQ,A} + C_{EQ,B} + C_{EQ,C} + C_{EQ,D}} \quad (7)$$
$$= \frac{(V_{OUT,A} + V_{OUT,B}) - (V_{OUT,C} + V_{OUT,D})}{V_{OUT,A} + V_{OUT,B} + V_{OUT,C} + V_{Out,D}}$$

These normalized difference values $\overline{\Delta}_x$ and $\overline{\Delta}_y$ may be scaled to produce values corresponding to the x and y coordinates of the displaceable member in the operational zone. Normalizing the difference values $\overline{\Delta}_x$ and $\overline{\Delta}_y$ in accordance with equations (6) and (7) reduces the impact of unintended applied forces that tend to tilt the target and other variations in the gap separating the conductive coupling element and the sense electrodes.

In the embodiments described in connection with FIGS. 9A-9B, the conductive coupling element 152 includes a peripheral conductive coupling element surrounding a central conductive coupling element that includes a displaceable coupling member 156 that is movable towards and away from the sense system substantially independently of the surrounding conductive coupling element. In some of these embodiments, the drive electrode E completely overlaps the displaceable coupling member 156 in each position of the displaceable member in the operational zone. In these embodiments, the vertical motion of the displaceable coupling member 156 affects only the capacitance $C_E$ of the drive electrode E. Therefore, the capacitance $C_E$ affects the measurements that are made for all of the peripheral sense electrodes. As a result, the capacitance $C_E$ only minimally affects the determination of the x and y coordinates of the displaceable member because these coordinates are normalized with respect to the total capacitance.

In some embodiments, vertical (or z-axis) forces that are applied to the displaceable member may be measured by determining the total capacitance ($C_T$) from the measurement values 32. Assuming that $V_{REF}$ is set to zero potential, $C_T$ is given by equation (8):

$$C_T = C_{EQ,A} + C_{EQ,B} + C_{EQ,C} + C_{EQ,D} \quad (8)$$
$$= K_1 \cdot (V_{OUT,A} + V_{OUT,B} + V_{OUT,C} + V_{OUT,D})$$

The processing system 18 detects movement of the displaceable coupling member 156 towards the drive electrode E based on a sum of all the measurement values generated in the given measurement cycle. In particular, the vertical displacement of the displaceable coupling member will reduce the gap under the displaceable coupling member and thereby increase the total capacitance measured by the processing system 18.

In some embodiments, the processing system 18 is configured to detect from the measurement signals 32 when the user has applied to the puck 42 a vertical force that exceeds a precalibrated "click" threshold. Based on this information, the processing system 18 determines whether or not the puck 42 is in a selection state (or "click" state), which may correspond to a display control function that corresponds to the functions that typically are associated with one or more of the right or left buttons of a typical computer mouse. In this way, the user can click at the current position of the cursor 34 on the display 24 by increasing the pressure that is applied to the puck 42 beyond the precalibrated click threshold. Some embodiments of the pointing device 10 include a mechanical clicking mechanism (e.g., a resilient dome switch) that provides tactile feedback for the click threshold.

Figure 18:
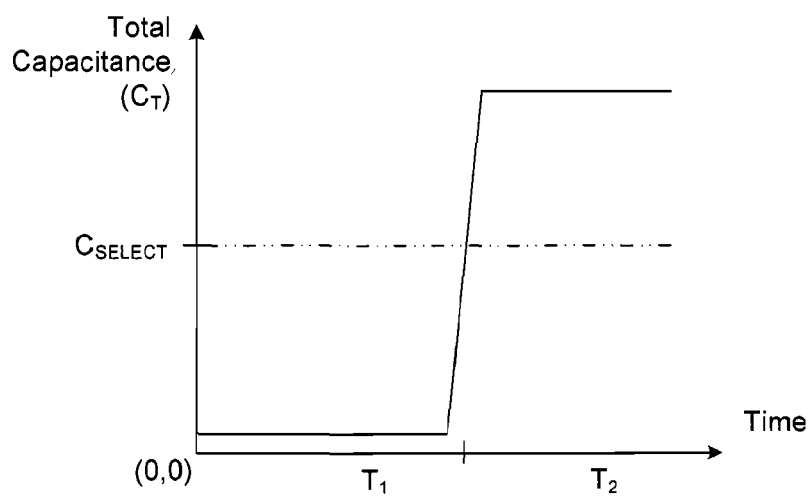
FIG. 18 is a graph of the total capacitance measured during a measurement cycle in accordance with the method of FIG. 16 plotted as a function of time.

FIG. 18 shows a devised graph of the total capacitance $C_T$ plotted as a function of time during a period when the user is applying to the displaceable coupling member 156 a no force during period $T_1$ and a selection force during period $T_2$. In some embodiments, the processing system 18 generates a select state signal indicating that the displaceable coupling member 156 has been depressed to make a selection in response to a determination that the sum of all the measurement values generated in the given measurement cycle exceeds a capacitance threshold $C_{SELECT}$ that corresponds to the precalibrated click threshold.

IV. EXEMPLARY DISPLAY CONTROL SIGNAL PRODUCTION METHODS

Figure 19:
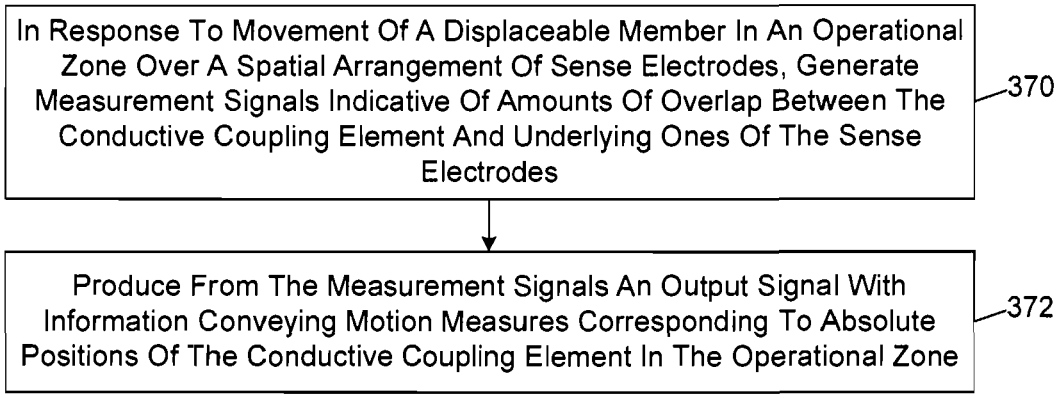
FIG. 19 is a flow diagram of an embodiment of a method executable by an embodiment of the pointing device shown in FIG. 1.

FIG. 19 shows a flow diagram of an exemplary embodiment of an input method that is implemented by the pointing device embodiments that are described herein. This method is described below in the context of the pointing device 10 shown in FIG. 1.

In accordance with this method, the measurement system 16 generates the measurement signals 32 in response to movement of the displaceable member in the operational zone over the spatial arrangement of sense electrodes and at least one drive electrode (FIG. 19, block 370). In this process, the measurement system 16 applies input signals 28 to the drive electrode. The conductive coupling element capacitively couples the input signals 28 from the drive electrode to ones of the sense electrodes underlying the conductive coupling element. The coupled input signals 28 are detected by the measurement system 16 as sense signals 30. In this way, the sense signals 30 are responsive to a touching of the displaceable member 12 by the user's finger 26 and to the different positions of the displaceable member 12 in the operational zone.

The measurement system 16 generates the measurement signals 32 from the resulting sense signals 30. The measurement signals 32 indicate amounts of overlap between the conductive coupling element and underlying ones of the sense electrodes and, therefore, indicate the different positions of the displaceable member 12 in the operational zone. The measurement signals 32 that are generated by the measurement system 16 either directly convey the current positions of the displaceable member 12 within the operational zone or convey information from which the current positions of the displaceable member 12 within the operational zone can be derived. As explained above, in some embodiments, the measurement signals 32 also indicate the vertical forces that are applied to the displaceable member 12. In this way, the measurement system 16 can detect when the displaceable member 12 is being touched or depressed to make a display-based selection.

In an absolute position mapping mode of operation, the processing system 18 produces from the measurement signals 32 the output signal 20 with information conveying motion measures corresponding to absolute positions of the conductive coupling element in the operational zone (FIG. 19, block 372). An embodiment of this process is described below with reference to FIGS. 20A and 20B.

Figure 20A:
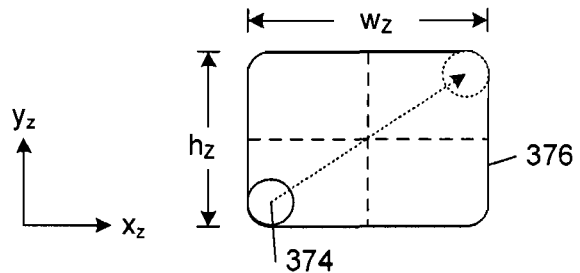
FIG. 20A is a diagrammatic view of a displaceable member being moved from a first position to a second position in an operational zone in an embodiment of the pointing device shown in FIG. 1.
Figure 20B:
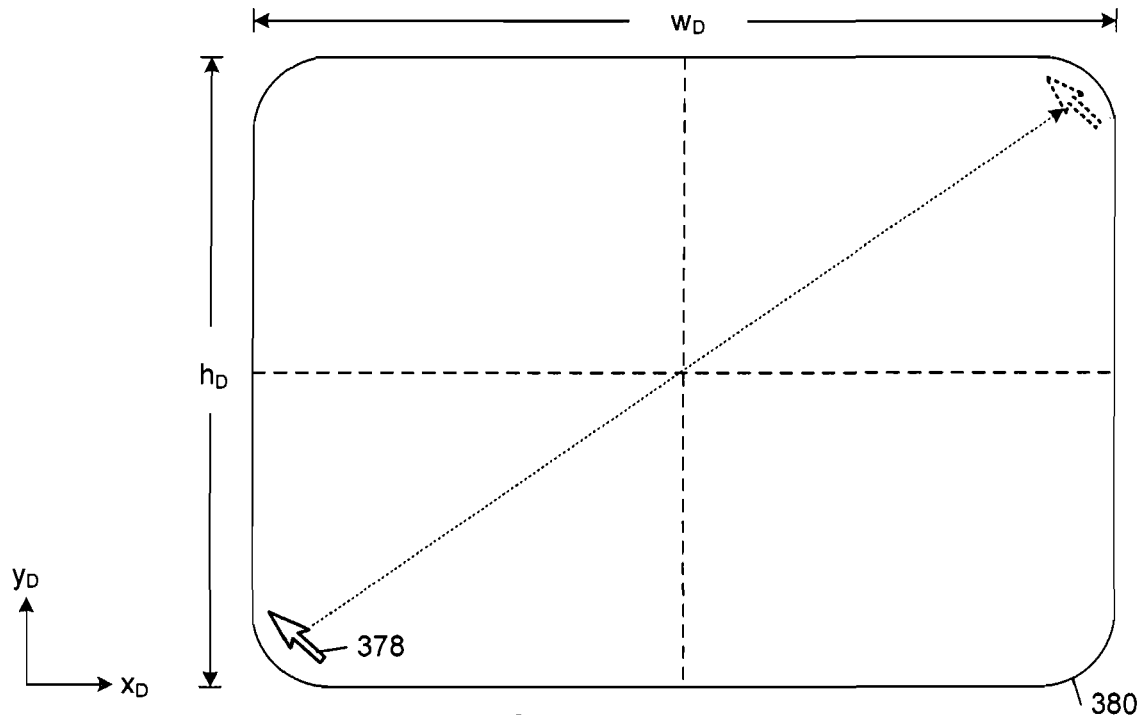
FIG. 20B is a diagrammatic view of a cursor being moved from a first position to a second position in a display screen in response to the displaceable member movement shown in FIG. 20A in accordance with an embodiment of an absolute position mapping input method.

FIG. 20A depicts an embodiment 374 of the displaceable member 12 (see FIG. 1) being moved from a first position (shown by solid lines) to a second position (shown by dashed lines) in an operational zone 376. FIG. 20B depicts the cursor 378 being moved from a first position (shown by solid lines) to a second position (shown by dashed lines) in an area 380 of the display 24 (see FIG. 1). In accordance with an absolute position mapping mode of operation, the processing system 16 produces the output signal 20 so that there is a one-to-one correspondence mapping between the positions of the displaceable member 374 in the operational zone 376 and the positions of the cursor 378 in the display area 380.

In accordance with these embodiments, in response to the movement of the displaceable member 374 from the first position to the second position as shown in FIG. 20A, the processing system 16 produces an output signal that causes the cursor 378 to move from the first position to the second position as shown in FIG. 20B. In this regard, the processing system 16 implements an absolute position mapping of the operational zone 376 to the display area 380, where each point of the operational zone 376 corresponds to a respective point in the display area 380. As shown in FIGS. 20A and 20B, the operational zone 376 has width and height dimensions of $w_Z$ and $h_Z$, respectively, and the display area 380 has width and height dimensions of $w_D$ and $h_D$, respectively. The processing system 16 determines each point $(x_D, y_D)$ in the display area 380 from the corresponding point $(x_Z, y_Z)$ in the operational zone in accordance with equations (9) and (10):

$$x_D = x_Z \cdot \frac{w_D}{w_Z} \qquad (9)$$

$$y_D = y_Z \cdot \frac{h_D}{h_Z} \qquad (10)$$

There is a correspondence between the active area and the display. The size of the operational area and active area can vary with the number of regions (e.g., four or six).

The processing system 16 then produces the output signal 20 corresponding to the display point positions that are determined in accordance with equations (9) and (10).

V. CONCLUSION

The pointing device embodiments that described herein are capable of sensing movement of a displaceable member with high accuracy and provide an absolute position mapping mode of input in which the positions of the displaceable member are mapped to positions of a cursor with a one-to-one correspondence.

Other embodiments are within the scope of the claims.

What is claimed is:

1. An input apparatus, comprising:
   a sense system comprising a spatial arrangement of sense electrodes and at least one drive electrode;
   a displaceable member movable in an operational zone over the sense system and comprising a conductive coupling element operable to capacitively couple signals from the at least one drive electrode to ones of the sense electrodes underlying the conductive coupling element;
   a measurement system coupled to the sense electrodes and operable to generate measurement signals indicative of amounts of overlap between the conductive coupling element and ones of the sense electrodes; and
   a processing system coupled to the measurement system and operable to produce from the measurement signals an output signal with information conveying motion measures corresponding to absolute positions of the conductive coupling element in the operational zone.

2. The apparatus of claim 1, wherein the spatial arrangement comprises regional sense electrodes in respective regions of the operational zone and at least one drive electrode.

3. The apparatus of claim 2, wherein at least one of the regional sense electrodes comprises discrete electrically conducting sensing elements distributed across a respective one of the regions of the operational zone, and the drive electrode comprises discrete electrically conducting sensing elements interspersed among the sensing elements of the at least one regional sense electrode.

4. The apparatus of claim 2, wherein the drive electrode comprises a pattern of electrode fingers and each of the regional sense electrodes comprises a respective pattern of electrode fingers interdigitated with the electrode fingers of the drive electrode.

5. The apparatus of claim 4, further comprising between the electrode fingers of the regional sense electrodes and adjacent ones of the electrode fingers of the drive electrode at least one noise-shielding electrical conductor that is electrically insulated from the electrode fingers and is electrically connected to a reference electrical potential.

6. The apparatus of claim 2, wherein the conductive coupling element has a spatial extent such that movement of the conductive coupling element from any location in the operational zone to any other location in the operational zone causes the conductive coupling element to overlap at least two of the regional sense electrodes.

7. The apparatus of claim 2, wherein at least one of the regional sense electrodes is divided into at least two electrode structures located in different respective areas of the spatial arrangement separated from one another by respective ones of the other regional sense electrodes.

8. The apparatus of claim 7, wherein the conductive coupling element has a maximal extent of overlap with the regional sense electrodes that is at most equal to a shortest one of distances separating all pairs of the electrode structures of each of the divided regional sense electrodes.

9. The apparatus of claim 1, further comprising a support surface on which the displaceable member is free to slide, and wherein the displaceable member is attached magnetically to the support surface.

10. The apparatus of claim 1, further comprising a support surface on which the displaceable member is free to slide and a mechanical mechanism that constrains the displaceable member to two-dimensional movement on the support surface.

11. The apparatus of claim 1, wherein the conductive coupling element comprises a first electrical conductor connected to a reference electrical potential, a second electrical conductor electrically insulated from the first electrical conductor, and an input button at least a portion of which is moveable toward and away from the sense system and is operable to selectively connect the first electrical conductor to the second electrical conductor to change capacitance coupling between the drive electrode and ones of the sense electrodes underlying the sense electrodes.

12. The apparatus of claim 1, further comprising a support structure that constrains the displaceable member to two-dimensional movement over the sense system and electrically connects the electrical conductor to a reference electrical potential.

13. An input apparatus, comprising:
   a sense system comprising a spatial arrangement of regional sense electrodes in respective regions of an operational zone and at least one drive electrode, wherein at least one of the regional sense electrodes comprises discrete electrically conducting sensing elements distributed across a respective one of the regions of the operational zone, and the drive electrode comprises discrete electrically conducting sensing elements interspersed among the sensing elements of the at least one regional sense electrode; and a displaceable member movable in an operational zone over the sense system and comprising a conductive coupling element operable to capacitively couple signals from the at least one drive electrode to ones of the sense electrodes underlying the conductive coupling element.

14. The apparatus of claim 13, wherein the drive electrode comprises a pattern of electrode fingers and each of the regional sense electrodes comprises a respective pattern of electrode fingers interdigitated with the electrode fingers of the drive electrode.

15. The apparatus of claim 14, further comprising between the electrode fingers of the regional sense electrodes and adjacent ones of the electrode fingers of the drive electrodes at least one noise-shielding electrical conductor that is electrically insulated from the electrode fingers and is electrically connected to a reference electrical potential.

16. The apparatus of claim 13, wherein the conductive coupling element has a spatial extent such that movement of the conductive coupling element from any location in the operational zone to any other location in the operational zone causes the conductive coupling element to overlap at least two of the regional sense electrodes.

17. The apparatus of claim 13, wherein at least one of the regional sense electrodes is divided into at least two electrode structures located in different respective areas of the spatial arrangement separated from one another by respective ones of the other regional sense electrodes.

18. The apparatus of claim 17, wherein the conductive coupling element has a maximal extent of overlap with the regional sense electrodes that is at most equal to a shortest one of distances separating all pairs of the electrode structures of each of the divided regional sense electrodes.

19. An input method, comprising:

in response to movement of a displaceable member in an operational zone over a spatial arrangement of sense electrodes and at least one drive electrode, generating measurement signals indicative of amounts of overlap between a conductive coupling element of the displaceable member and ones of the sense electrodes; and producing from the measurement signals an output signal with information conveying motion measures corresponding to absolute positions of the conductive coupling element in the operational zone.

20. The method of claim 19, wherein the generating comprises measuring levels of capacitive coupling between at least one drive electrode and respective ones of regional sense electrodes in respective regions of the operational zone.

21. The method of claim 20, wherein the measuring comprises measuring levels of capacitive coupling between ones of electrode fingers of the drive electrode interdigitated with respective ones of electrode fingers of each of the regional sense electrodes.

22. The method of claim 20, wherein the generating comprises generating a given measurement signal indicative of amount of overlap between the conductive coupling element and a given one of at least two separate electrode structures of a corresponding one of the regional sense electrodes, and the producing comprises producing the output signal with information identifying the given one of the at least two separate electrode structures of the corresponding regional sense electrode.

23. The method of claim 22, wherein the producing of the output signal with the identifying information is based on ones of the measurement signals including the given measurement signal.

* * * * *